(12) United States Patent
Nakajima et al.

(10) Patent No.: US 6,918,539 B2
(45) Date of Patent: Jul. 19, 2005

(54) METHOD OF AND DEVICE FOR READING OPTICAL DATA CODE

(75) Inventors: Katsuki Nakajima, Fukuchiyama (JP); Koji Sakacho, Fukuchiyama (JP); Takuya Murata, Fukuchiyama (JP)

(73) Assignee: Omron Corporation, Kyoto (JP)

( * ) Notice: Subject to any disclaimer, the term of this patent is extended or adjusted under 35 U.S.C. 154(b) by 146 days.

(21) Appl. No.: 10/463,240

(22) Filed: Jun. 16, 2003

(65) Prior Publication Data

US 2004/0026508 A1 Feb. 12, 2004

(30) Foreign Application Priority Data

Jun. 18, 2002 (JP) .................................... 2002-176780
Jun. 5, 2003 (JP) .................................... 2003-160712

(51) Int. Cl.[7] ............................................... G06K 07/10
(52) U.S. Cl. .................................. 235/454; 235/462.25
(58) Field of Search .................... 235/462.01, 462.45, 235/472.01, 472.02, 454, 472.03, 455, 494, 375

(56) References Cited

U.S. PATENT DOCUMENTS

| | | | | |
|---|---|---|---|---|
| 5,594,230 A | * | 1/1997 | Waite et al. ............ 235/462.15 |
| 5,861,613 A | * | 1/1999 | Apelberg et al. ........... 235/454 |
| 5,902,988 A | * | 5/1999 | Durbin .................. 235/472.01 |
| 6,145,745 A | * | 11/2000 | Hauser et al. ......... 235/462.07 |
| 6,246,785 B1 | * | 6/2001 | Molnar et al. .............. 382/133 |
| 6,250,551 B1 | * | 6/2001 | He et al. ................ 235/462.07 |
| 6,405,925 B2 | * | 6/2002 | He et al. ................ 235/462.25 |
| 6,547,144 B1 | * | 4/2003 | Dickson et al. ........ 235/462.34 |
| 6,561,424 B1 | * | 5/2003 | Dickson et al. ........ 235/462.01 |
| 6,840,449 B2 | * | 1/2005 | Check et al. .......... 235/462.01 |
| 2005/0001035 A1 | * | 1/2005 | Hawley et al. ........ 235/462.21 |

FOREIGN PATENT DOCUMENTS

JP          9-274636          10/1997

* cited by examiner

Primary Examiner—Thien M. Le
(74) Attorney, Agent, or Firm—Beyer Weaver & Thomas LLP

(57) ABSTRACT

A two-dimensional code reader repeats a cycle of ordinary code-reading processes such as taking an image of an optical data code, extracting a two-dimensional code from the image and decoding optical data of the two-dimensional code in the image. A specified evaluation value for the optical data code is obtained from the results of processes carried out prior to the decoding step and stored if the decoding is done successfully. Data which show the changes in the evaluation value with time are displayed. The evaluation value may be compared with a specified warning level and a warning output is made, depending on the result of the comparison.

20 Claims, 15 Drawing Sheets

| EVALUATION ITEM | FORMULA FOR CALCULATING EVALUATION VALUE |
|---|---|
| (1) Accuracy in extraction of finder pattern | Correlation value R(%) |
| (2) Reliability of extracted finder pattern | Formula (A): $FN_{rat} = 100 \times (FN_{max} - FN + 1)/FN_{max}$ |
| (3) Decoding accuracy | Formula (B): $Er = 100 \times (1-P)$ |
| (4) Cell Size | Formula (C) (if B<W): $S = 100 \times \{2B/(B+W)\}$ Formula (D) (if B≥W): $S = 100 \times \{2 - 2B/(B+W)\}$ |
| (5) Image contrast | Formula (E): $C1 = 100 \times |Q_W - Q_B|/T$ |
| (6) Ratio of defective cells | Formula (F): $C2 = 100 \times (1 - U/M)$ |
| (7) Pixel distribution in cell | Formula (G): $V = 100 \times 1/Var$ |

*FIG. 4*

| ITEM | CALCULATION OF EVALUATION VALUE | WARNING LEVEL | COMMENT |
|---|---|---|---|
| LIGHT (Li) | $Li = \frac{99}{190}(w-b) - \frac{80}{19}$ (a) | $Li \leq 6$ | LIGHTING MAY BE WRONG. MAKE IT LIGHTER (IF W<50) MAKE IT DARKER (IF W=255) |
| FOCUS (Fc) | $Fc = \frac{99}{2-C}(E-C) + 1$ (b) | $Fc \leq \frac{99}{C-2} + 1$ | FOCUS MAY BE OFF |
| MARKING (Mk) | $Mk = MIN\left[\frac{CDmax - CD}{CDmax} \times 100 \;(c1), \frac{CFmax - CF}{CFmax} \times 100 \;(c2), \frac{CTmax - CI}{CTmax} \times 100 \;(c3)\right]$ | $Mk \leq \left[\frac{1}{CDmax} \times 100, \frac{1}{CFmax} \times 100, \frac{1}{CTmax} \times 100\right]$ | THERE IS A CELL THAT CANNOT BE IDENTIFIED. |
| SIZE (Cs) | $Cs = MIN\left[\begin{array}{l}\text{IF } D \leq 7: 33D - 131 \;(d1)\\ \text{IF } 7 < D \leq 10: \frac{100}{10 - \frac{345}{M+2}} \times (C-10) + 100 \;(d2)\end{array}\right]$ | $D \leq 4$ OR $C \geq \frac{345}{M+3}$ | MAKE THE FIELD OF VISION SMALLER MAKE THE FIELD OF VISION LARGER |
| LOCATION (Lo) | $Lo = \frac{99}{161M - S} \times (ML - S) + 1$ (e) | $Lo < \frac{198S}{161M - S} + 1$ | SET THE CODE AT THE CENTER |
| BACKGROUND (Bg) | $Bg = \frac{90}{FNmin - FNmax} \times (FN - FNmin) + 100$ (f) | | |

FIG. 14

METHOD OF AND DEVICE FOR READING OPTICAL DATA CODE

BACKGROUND OF THE INVENTION

This invention is in the technical field of using an instrument such as a camera or a scanner to obtain image data of a symbol including a visibly recognizable pattern such as a bar code and a two-dimensional code and encoding specified information and carrying out image processing on the symbol in the generated image to thereby read out the information represented by this symbol. Throughout herein, such visually recognizable data represented by a symbol, such as arrangements of black and white, density variations and color arrangements, will be referred to as "optical data" and the corresponding symbol will be referred to as "optical data code."

Bar codes and two-dimensional codes are set so as to represent various data by distributing a white-black pattern according to a specified method. Two-dimensional codes can represent larger numbers of data than bar codes can because data-representing areas called "cells" are arranged two-dimensionally.

FIGS. 21A and 21B show respectively a data matrix and a QR code which are both a representative example of two-dimensional code. A data matrix has an L-shaped finder pattern 40 formed along two mutually perpendicular sides for defining the direction of the code and a likewise L-shaped timing pattern 41 is formed along the remaining two mutually perpendicular sides. The finder pattern 40 is usually formed by arranging black cells and the timing pattern 41 is usually formed by arranging black and white cells alternately.

A QR code usually includes three rectangular positioning symbols 42a, 42b and 42c to form a finder pattern 42. Each of the positioning symbols 42a, 42b and 42c is formed with a frame of white cells around a rectangular pattern made of a plurality of black cells and further with a frame of black cells around this white frame. These positioning symbols 42a, 42b and 42c are each distributed at a position representing a corner of the code, and an L-shaped pattern having black and white cells alternately is formed by connecting the inner angular parts of the symbols 42a, 42b and 42c. The relationship between black and white cells may be reversed, depending on the condition of the background both for the data matrix and for the QR code.

For reading a two-dimensional code as described above, an image processing method by an edge extraction process or a pattern matching process is used first to extract the finder pattern 40 or 42 on the image to ascertain the position and orientation of the code. Next, the timing pattern 41 or 43 is detected on the basis of the extracted finder pattern 40 or 42. The positions of the other cells are identified on the basis of the arrangement of black and white cells in this timing pattern 41 or 43.

Next, the image data of the identified cells are used to carry out the decoding process for converting the optical data represented by these cells into a data format recognizable by a computer. In this decoding process, a process such as binary conversion is used to determine whether each cell is black or white, and the optical data represented by the cells are encoded according to the results of such determinations. The codes of individual cells are arranged for each group of cells representing data for one character (symbol character) such that code data representing each character are generated. During this time while these conversions are made, a process (error correcting process) is carried out for correcting the errors committed while the black and while conditions of the cells are determined.

A two-dimensional code can be made very small in area by adjusting the size of its cells. Since a so-called direct marking method has recently been developed whereby laser light or a time-puncher pin is used to mark a code directly on the surface of a metal, it has become possible to easily mark a miniature two-dimensional code in a semi-permanently inerasable form even on small objects such as electronic components.

Systems making use of this direct marking method are currently being introduced such as a system for a production line in a factory for transporting products marked with a two-dimensional code and reading out the data represented by these codes during the course of the transportation of these products such that the destinations and treatment methods in their subsequent production steps can be identified. When such a system is introduced into a factory where data management must be carried out at a high level of accuracy, a careful adjustment must be made on the two-dimensional code reader when it is set such that two-dimensional codes can be read out reliably. For example, the image-taking device must be focused correctly and the illumination device must be adjusted such that the boundaries between the cells and the black and white conditions of the cells will not be misjudged and the size of the field of vision must be corrected such that the two-dimensional code will not move beyond the field of vision or the individual cells will not become smaller than the limit of dissolution.

Conventional two-dimensional code readers are adapted to calculate and output the readout ratio, or the ratio between the number of times decoding was successfully made and the total number of readout processes carried out. The readout ratio is the same, however, as long as the decoding is successful whether the image of the two-dimensional code is in an optimum condition or it is in a bad condition such that the decoding is nearly impossible. Thus, the user can neither determine with what margin of safety the optical data are being decoded nor make an adequate adjustment such that an image suitable for decoding may be obtained.

Japanese Patent Publication Tokkai 9-274636 discloses an optical code reader adapted to output data indicative of the degree of error corrections carried out at the time of a readout process. According to what is disclosed therein, maximum and minimum numbers of error corrections in a readout process are obtained and thereafter these numbers are converted into the maximum and minimum of error correction ratio or its complement. As the range determined by the maximum and minimum thus obtained is displayed, the level of error correction can be understood. In other words, the error correction ratio according to this disclosure is the ratio of the number of error corrections with respect to the number of errors that could be corrected. Thus, even if two-dimensional codes are successfully read out, it may be concluded that the margin of safety is small if the ratio of error correction is large.

This publication discloses the display of such error correction ratio being made in the test mode at the time of introduction during which a series of processes including the taking of the image of the code, extraction of the finder pattern, assignment of symbols to cells, correction of errors and decoding is carried out for a plurality of number of times while the two-dimensional code is kept stationary or moving and the aforementioned display is made on the basis of the maximum and minimum of the number of error corrections after a plurality of processes have been made.

The invention according to aforementioned Japanese Patent Publication Tokkai allows a user to know the extent to which error corrections have been made by executing the test mode explained above and to leave a sufficiently wide margin of safety for decoding by adjusting the image-taking device or illumination if the degree of error correction has been too large such that the ratio of correction can be reduced.

In the case of data management systems for factories, however, many two-dimensional codes must be processed sequentially at a high speed, and the margin of safety for decoding becomes smaller as the frequency of processes increases. One of the reasons for this may be that the two-dimensional codes themselves undergo changes. If two-dimensional codes are made by direct marking, for example, conditions of the code may change because the laser diode and time-punching pins used in the direct marking process do not fail to deteriorate. As a result of wears and tears of such devices for the direct marking, the image density or the cell size may change, making the decoding difficult.

The decoding becomes difficult also if the illumination condition changes, for example, because the lamp is getting old and the image density changes. There are other possible causes on the side of the two-dimensional code reader such as the displacement of the image-taking device causing a focusing error or a change in the size of the field of vision.

Since deterioration of the image of a two-dimensional image grows with the elapsed time, it is important to quickly detect a sign of degradation and to take a countermeasure, say, by replacing components that are wearing out. Since only a test mode is carried out at the beginning according to Japanese Patent Publication Tokkai 9-274636, it is difficult by this method to detect a situation where the quality of the image of a two-dimensional code has deteriorated so much while it is being read out that it is nearing the level where the decoding is almost impossible. By this method, the series of processes from the taking of an image of a code to the decoding is repeated several times in a cycle and the range of correction ratio is outputted for each cycle, but nothing much more. In other words, the user can only get a vague idea of the variation in the margin of safety in the decoding process and it is difficult to determine whether the quality of the image of a two-dimensional code is deteriorating or not.

Moreover, since it is extremely difficult for an ordinary user to guess the cause of an error simply by looking at the error correction ratio, it will take a long time for ascertaining the causes of the errors. Thus, a proper countermeasure cannot be taken in an efficient manner.

According to the method of aforementioned Japanese Patent Publication Tokkai 9-274636, furthermore, the number of error corrections is calculated for each symbol character. Thus, no matter how large is the number of cells where an error has occurred, the number of corrections is counted as 1. This means that it is difficult to determine from the number and ratio of error corrections alone how a two-dimensional code is suited for decoding.

SUMMARY OF THE INVENTION

The present invention was accomplished in view of the problems described above. Its object is to make it possible to detect easily and constantly while optical data codes are being read out in an ordinary manner whether or not the quality of the optical data code in each image is changing in the direction of making it impossible to decode such that a measure can be taken quickly against such a change.

In what follows, methods of and devices for reading out optical data codes will be sequentially explained. Throughout herein, the expression "process of reading out an optical data code" (or "readout process") is intended to include all processes from the process of obtaining an image of the optical data code until the optical data are decoded.

The invention relates firstly to a method of reading out an optical data code characterized as comprising the steps of sequentially carrying out an image-taking step of taking an image of an optical data code comprising visually identifiable symbols, a code-extracting step for extracting the optical data code in the image by carrying out a specified image processing on the image and a decoding step for carrying out a different image processing on the extracted optical data code and decoding optical data represented by the optical data code from results of this different image processing, obtaining an evaluation value for the optical data code in the image from results of processes carried out prior to the decoding step if the decoding step was successful, storing the evaluation value, and outputting data (hereinafter referred to as "change-showing data") showing changes in the evaluation value with time by using the evaluation value and a plurality of earlier evaluation values that were stored previously.

The image-taking step mentioned above for taking an image of an optical data code may be carried out by using an image-taking device provided with an image-taking element such as a lens and a CCD and preferably include the step of carrying out an A/D conversion process on the image generated by such an image-taking element.

In the code-extracting step mentioned above for extracting the optical data code in the image, it is preferable to extract at least the position and the orientation of the image. One of the optimal methods of extraction may be to extract a specified pattern included in the optical data code from the image obtained in the image-taking step. Patterns having a common shape among codes of a same kind may be used as the specified pattern such as a finder pattern in the case of a two-dimensional code and the start character on the left-hand end in the case of a bar code.

The image processing for extracting a specified pattern may be carried out by a pattern matching method by using a model of that specified pattern. If the specified pattern is a linear pattern or has same designs arranged in a straight line, use may be made of a method of extracting edge points in the image first, setting a line segment of a specified length perpendicularly to the density gradient at each of these edge points and extracting an image area such that these line segments overlap to a greater than specified degree.

In the decoding step for decoding optical data represented by the optical data code, the position of the area where data to be decoded are encoded (herein referred to as the data display area) is initially identified. Thereafter, small areas (such as cells in the case of a two-dimensional code and bars or spaces in the case of a bar code) representing minimum units of optical data are identified and the optical data represented by each of such small areas can be encoded. If the results of such processes are put together for each symbol character, optical data within the data display area can be decoded. An error correcting process for correcting errors generated in the identification of the individual small areas for each symbol character may be carried out in this decoding step.

By sequentially carrying out the aforementioned image-taking, code-extracting and decoding steps, optical data represented by a single optical data code can be converted into data in a form recognizable by a computer. By repeatedly carrying out cycles of these three steps, furthermore, readout processes can be sequentially carried out on a plurality of optical data codes, as is the case with prior art methods of reading out optical data codes as well as the second embodiment of this invention to be described below.

In the process of repeatedly carrying out these cycles of operations according to this invention, an evaluation value may be obtained and stored for the two-dimensional code being processed every time the decoding process is successful. It is also possible to use the obtained evaluation value and the evaluation values stored earlier to output data showing changes with time of the evaluation value.

In the above, the evaluation value may be considered to reflect the degree to which an optical data code in an image obtained in the image-taking step is suited for the decoding process. In the step of storing evaluation values, it is desirable to sequentially accumulate the evaluation values obtained while a specified number of cycles of the image-taking, code-extracting and decoding steps are carried out. In the above, "data showing changes with time of the evaluation value" may be considered to be data showing the past changes of the evaluation value while a specified number of cycles of processes from the present have been carried out.

If the marking conditions of the optical code or the environmental conditions of illumination deteriorate gradually, or if the image-taking part becomes displaced and the adjusted condition of the focus or the field of vision is changed, the quality of the optical data codes in an image may be expected to change in the direction of becoming difficult to decode. By a method described above, it can be easily judged during the course of repeating the readout process of optical data codes by using the changes with time of evaluation values whether the quality of optical data codes has a tendency of deteriorating. Thus, the user can remove the cause of deterioration before the situation becomes too serious such that the decoding cannot be carried out.

In the aforementioned step of outputting change-showing data in this embodiment of the invention, the change-showing data may be displayed in contrast to a specified warning level. This may be done, for example, by displaying a graph showing the changes in an evaluation value together with a straight line indicative of the warning level. Since this will enable the user to visually ascertain the evaluation values and whether or not their changes with time are close to the warning level and even an ordinary user can judge whether or not the quantity of the optical data code is changing in the deteriorating direction.

The invention relates also to another method of reading out an optical data code. In this method according to a second embodiment of the invention, too, the image-taking, code-extracting and decoding steps are sequentially carried out. Thereafter, steps of obtaining a specified evaluation value for the optical data code in the image from results of processes carried out prior to the decoding step if the decoding step was successful in decoding the optical data, comparing the evaluation value with a specified warning level and carrying out a specified warning process if the evaluation value reaches the warning level are carried out.

In the above, the step of obtaining an evaluation value is the same as explained above for the first embodiment of the invention and hence will not be presented repetitiously. The specified warning level may be set by preliminarily taking images of optical data codes that are suited for the decoding process as well as those of optical data codes not suited and obtaining evaluation values from the obtained images. The warning level may be obtained from an optical data code which has already deteriorated to such an extent that it can no longer be decoded but it is preferable to make use of an optical data code which can still be decoded although it is nearing a condition in which it can no longer be decoded.

In the step of carrying out a warning process, a warning buzzer may be sounded or warning data may be displayed on a display device. A warning signal may be outputted to an external apparatus connected to the apparatus using the method of this invention. If the condition of deteriorating quality of optical data code is represented by an increase in an evaluation value, it may be judged that the warning level has been reached when the evaluation value has exceeded the warning level. If the condition of deteriorating quality of optical data code is represented by a decrease in an evaluation value, it may be judged that the warning level has been reached when the evaluation value has become smaller than the warning level.

By this method, it is constantly watched while repeatedly carrying out the cycle of image-taking, code-extracting and decoding steps whether the quality of optical data codes in an image has the tendency of deteriorating and a report can be outputted to the user or to a host system if the evaluation value has reached the warning level. Thus, a countermeasure can be taken even if there is no trouble yet in the readout process such that the cause of the deterioration in the quality of optical data code can be quickly eliminated.

The method of this invention according to either of the embodiments described above can be practiced in any of the following forms.

Firstly, the aforementioned code-extracting step may comprise the steps of carrying out a correlation calculation while scanning a model with a specified pattern contained in the optical data code on the image taken in the image-taking step and identifying as extraction position of the optical data code where a correlation value obtained by the correlation calculation exceeds a specified threshold value, and the correlation value obtained at the extraction position is identified as the evaluation value.

In such a code-extracting step, a so-called pattern-matching process is carried out to extract a specified pattern in the optical data code. If the image contains a pattern which resembles the model, a fairly high correlation value should be obtained in the aforementioned correlation calculation. If the shape and density distribution of a specified pattern has changed because of a deteriorated condition of parts of the marking device, for example, the correlation value may be expected to become smaller accordingly. If it becomes impossible to extract any optical data code, it naturally also becomes impossible to carry out the subsequent decoding process. Thus, the user can easily judge whether the quality of optical data codes in an image has a tendency to deteriorate.

Secondly, the code-extracting step may comprise the step of extracting a specified pattern included in the optical data code from the image taken in the image-taking step and an evaluation value is obtained by using the number of extractions of the specified pattern in the code-extracting step.

If the specified pattern is to be extracted by pattern matching as explained above, for example, the number of times this specified pattern is extracted corresponds to the number of times a correlation value exceeds the aforementioned threshold value. If the readout process is carried out by taking the image of optical data codes one at a time, the number of specified patterns appearing in the image should be one. If marking is made in addition to the intended marking because of a deteriorated condition of parts of the marking device or a shadow is cast because of a change in the illumination condition, a noise may be generated and erroneously extracted as a specified pattern. In such a situation, the decoding process will be carried out on all extracted results inclusive of such noise.

Even if such noise is generated, there is no trouble if the decoding process is completed within the processing time prepared for the optical data code. If the number of noise increases, however, time may be wasted in the extraction of the specified pattern and there may not be enough time left for the decoding process. It is therefore preferable to calculate the evaluation value, say, by using the ratio of the number of times of extraction of a specified pattern with respect to the number of decoding processes that can be carried out within the aforementioned prepared processing time.

This evaluation value may be used also for checking the condition of the background at the time of the initialization process before the readout process is carried out in an actual operation. If the object surface to be processed has a design or unevenness, the probability of generating noise becomes higher but since the effects of noise on the readout process can be preliminarily checked by means of the evaluation value, adjustments of the environmental conditions such as illumination can be adjusted such that a readout process can be carried out under a condition as reliable as possible.

Thirdly, the decoding step may comprise the step of individually identifying small areas each representing a minimum unit of the optical data. The evaluation value may be obtained for at least one selected from focus arrangement when the image is taken of the optical data code, contrast in the optical data code, size of the small areas, density distribution in the small areas and location of the optical data code by a calculation by using identification results of the small areas and image data inside an image area that includes the optical data code.

In the aforementioned step of individually identifying small areas each representing a minimum unit of the optical data, the position and size of each small area as well as boundaries between neighboring areas can be identified. For each of the small areas within the aforementioned data display area, contents of optical data in the smallest units corresponding to the small area can be identified on the basis of the image data of each small area. It is preferable to convert the results of such identification in a form recognizable by a computer.

In the case of a two-dimensional code, for example, processes of identifying each cell of a timing pattern, identifying the position and size of each cell in the data display area on the basis of the arrangement of the timing pattern and carrying out a binary conversion on every cell in the data display area on the basis of whether it is black or white may be carried out in the same step.

To explain some of the expressions used above more in detail, focus adjustment means adjusting the focus of the camera for obtaining the image of the optical data code. An evaluation value can be calculated by using the results of image processing (such as differentiation) for extracting changes in density on an image. In an area where a black small area and a white small area are next to each other in the timing pattern of a two-dimensional code or a bar code, it can be judged by using such an evaluation value whether a focus adjustment can be made only for the purpose of clearly identifying the boundary between a black area and a white area.

The evaluation value for contrast of an optical data code may be interpreted as indicating how appropriate the condition of illumination is for the optical data code. This evaluation value may be obtained from the difference between the density of a small area determined to be black and that determined to be white. Such an evaluation value may be used to judge whether the condition of illumination is adequate for clearly distinguishing a black small area from a white small area. The size of a small area means the size of an individual one of the small areas representing the smallest unit of the optical data. The size of the small area varies as the field of vision of the image-taking part is adjusted, and the evaluation value can be obtained from the width or area of the small area. Each small area must be set so as to be large enough for allowing the optical data represented thereby can be determined but small enough such that the entire image of the optical data code will fit within an image. Thus, it can be judged from the evaluation value for the size of small area whether the field of vision is adequately set. This evaluation value can be used also for checking the effects of changes with time of the condition of marking of the optical data code.

Density distribution inside a small area means the density distribution among the plurality of pixels forming each small area. An evaluation value for this purpose may be obtained from the dispersion of the density values of the pixels within the small area. In the case of the readout process of a two-dimensional code, for example, an average density value within a cell is obtained first and then a binary conversion is made. If the variation in density within the cell becomes too large after parts of the marking device deteriorate, there is a possibility of error in the binary conversion. By using the evaluation value for the density distribution within the small area, it is possible to judge whether or not there is a change in the marking device or the condition of illumination that will cause an error in identifying the optical data from the smallest unit.

The code position means the position of an optical data code with respect to the field of vision. When optical data codes are sequentially transported into the field of vision of the image-taking means, for example, an evaluation value for the code position can be used to judge how appropriate is the position of the optical data code with respect to the field of vision. This evaluation value can be obtained by calculating the distances from the edges of the field of vision to the optical data code on the basis of the coordinates of the ends or edges of the code when the optical data code was extracted and by using such calculated distances. Alternatively, a center point of the code may be extracted and an evaluation value may be set by reflecting the distance between the position of this extraction and the center of the field of vision.

By using such an evaluation value, it is possible to determine whether the manner of transportation of the optical data codes and the set position of the image-taking means are appropriate. Thus, it may be used for positioning the image-taking means or checking the variations in the positions of the optical data codes during the initialization process before starting the actual readout process.

If evaluation values of all five types described above are obtained and their changes with time are sequentially displayed, it becomes possible to ascertain the evaluation item in which deterioration is taking place and the cause of adversely affecting the quality of the optical data code in an image. For ascertaining whether the setting of the image-taking means or the illumination is appropriate at the time of initialization, for example, items required by the user may be conveniently selected and readout process may be repeated for a plurality of cycles such that desired identification can be easily carried out. It goes without saying in this connection that all of the items may be selected.

Fourthly, the decoding step may comprise the step of individually identifying small areas each representing a minimum unit of the optical data. A value indicative of the degree of error in the step of individually identifying small areas may be calculated in the step of obtaining the evaluation value. The position and size of each small area and the boundary between neighboring small areas can be identified in the step of individually identifying small areas. For each small area in the data display area, the contents of the minimum unit of optical data corresponding to the small unit can also be identified.

An evaluation value for this case may be obtained by dividing the number of small areas where errors occurred in the identification process by the total number of small areas or the maximum number of error corrections that can be carried in the small areas. The evaluation value thus obtained for this case is different from the ratio of error correction mentioned in aforementioned Japanese Patent Publication Tokkai 9-274636 and varies, depending on the number of small areas where an error has occurred. For example, the formula for obtaining the evaluation value may be derived such that it will become smaller with the occurrence of an error or with the increase in the number of small areas where an error occurs. Thus, an evaluation value which reflects the margin of safety for the decoding process is more accurately obtained and a change in the quality of optical data codes in an image in the deteriorating direction can be detected at an earlier stage. For a readout process for a two-dimensional code, not only cells inside the data display area but cells in the finder pattern and the timing pattern may also be included in extracting cells with an error.

Fifthly, use may be made of evaluation values stored while a plurality of cycles of the image-taking, code-extracting and decoding steps are carried out to predict whether or not the decoding step will be successful after processes of the image-taking, code-extracting and decoding steps are carried out for a plural number of cycles. A specified warning process is carried out if it is predicted that the decoding step will not be successful. This prediction may be made by setting a straight or curved line which approximates the changes on the basis of the evaluation values from a plurality of earlier cycles and comparing the value at the point in time on the line when a specified plural number of cycles have been carried out. Such a straight or curved line may be set on the basis of not only individual evaluation values but also on the average of evaluation values during a specified period or an a moving average obtained every time an evaluation average is calculated.

In this way, even if there is no problem in the current readout process at the present time, the user may be informed of the possibility that the quality of the optical data code may be deteriorate so as to make the decoding impossible within a specified number of cycles. For the kind of evaluation value used for the prediction, it is also possible to identify the cause of deterioration in the quality of the optical data codes.

With reference to either embodiment of the invention described above, evaluation values of any of these different types can be obtained. While evaluation values of all these types are obtained, outputs of data showing changes with time and comparisons with warning levels may be carried out only regarding selected ones of them. In this manner, the evaluation values to be outputted or compared can be varied according to the user's purpose or the possibility of deterioration in the quality of optical data code and judgments regarding the deterioration in the quality can be rendered more accurately.

An optical data code reader according to a first embodiment of the invention is for the purpose of carrying out the method of this invention according to the first embodiment and may be described as comprising image taking means for taking an image of an optical data code comprising visually identifiable symbols, image processing means for extracting the optical data code by carrying out a specified image processing on the image, decoding means for carrying out a different image processing on the optical data code extracted by the aforementioned specified image processing and decoding optical data represented by the optical data code from results of the different image processing, evaluation value obtaining means for obtaining a specified evaluation value for the optical data code in the image from results of processes carried out by the image processing means and/or the decoding means if the decoding means was successful in decoding the optical data, memory means for storing the evaluation value, and outputting means for generating change-showing data showing changes in the evaluation value with time by using a plurality of evaluation values stored in the memory means.

The image taking means is provided at least with an input interface for inputting an image generated by an image taking device such as a camera. If analog image signals are inputted, it is preferable to provide the image taking means with an A/D converter circuit. The aforementioned image taking, decoding and evaluation value obtaining means each may be a computer having a program incorporated respectively for carrying out the aforementioned step of extraction, decoding and obtaining evaluation value. A separate computer may be provided for the function of carrying out image processing in the image processing means and the decoding means.

The memory means is usually a memory device in the aforementioned computer and preferably is of a sufficiently large capacity so as to be able to store the evaluation values corresponding to a specified number of operations for each kind. The number to be stored may be variable but an upper limit value may be set such that as the number to be stored exceeds this upper limit value the data corresponding to the oldest evaluation value are erased.

The outputting means may comprise not only a display device to be described below but also an interface circuit for outputting data that indicate changes in evaluation values with time.

The image taking means and the decoding means sequentially operate whenever an image containing an optical data code is received by the image taking means and the optical data represented by the optical data code are decoded. If this decoding process is successful, the evaluation value obtaining means obtains a specified evaluation value for the object optical code to be processed. The evaluation value thus obtained is stored in the memory means and made into data indicative of the past changes together with the earlier obtained evaluation values and outputted by a process such as a display.

The optical data code reader according to this embodiment may also include in the outputting means a device for displaying data indicating the changes in the evaluation value with time together with a specified warning level. Such display may preferably be made by way of a graph but this is not intended to limit the scope of the invention. Displays may be made numerically.

An optical data code reader according to a second embodiment of the invention is for the purpose of carrying out the method of this invention according to the second embodiment and comprises image taking means, image processing means, decoding means and evaluation value obtaining means like the optical data code reader according to the first embodiment described above and also judging means for judging whether or not the evaluation value obtained by the evaluation value obtaining means has reached a specified warning level and warning means for outputting specified warning data when the judging means judges that the evaluation value has reached the warning level.

The judging means preferably comprises a computer incorporating a program for a comparison process. The warning means may be formed as a mechanism for activating a buzzer or a lamp when the evaluation value has reached the warning level. A warning signal such as "OK" and "NG" may also be transmitted to an external apparatus. An optical data code reader of this invention, whether according to the first or second embodiment, may be adapted to use the method of this invention as explained above. For this purpose, an input device for receiving the user's choices may be incorporated. The input device may comprise an external consol or a selection switch set on the main body of the code reader device. The outputting means may be structured so as to also function as a display device. The image taking means and a monitor serving as a displaying means may be formed as an integrated component. An optical code reader of this invention can be used not only as a two-dimensional code reader but also as a bar code reader. It can also be formed as a one-dimensional code reader.

BRIEF DESCRIPTION OF THE DRAWINGS

FIG. 4 is a table of evaluation items and methods of calculating corresponding evaluation values for two-dimensional codes.

FIG. 14 is a table of evaluation items and formulas for calculating corresponding evaluation values for two-dimensional codes, together with warning levels and comments to be displayed.

DETAILED DESCRIPTION OF THE INVENTION

Figure 1:
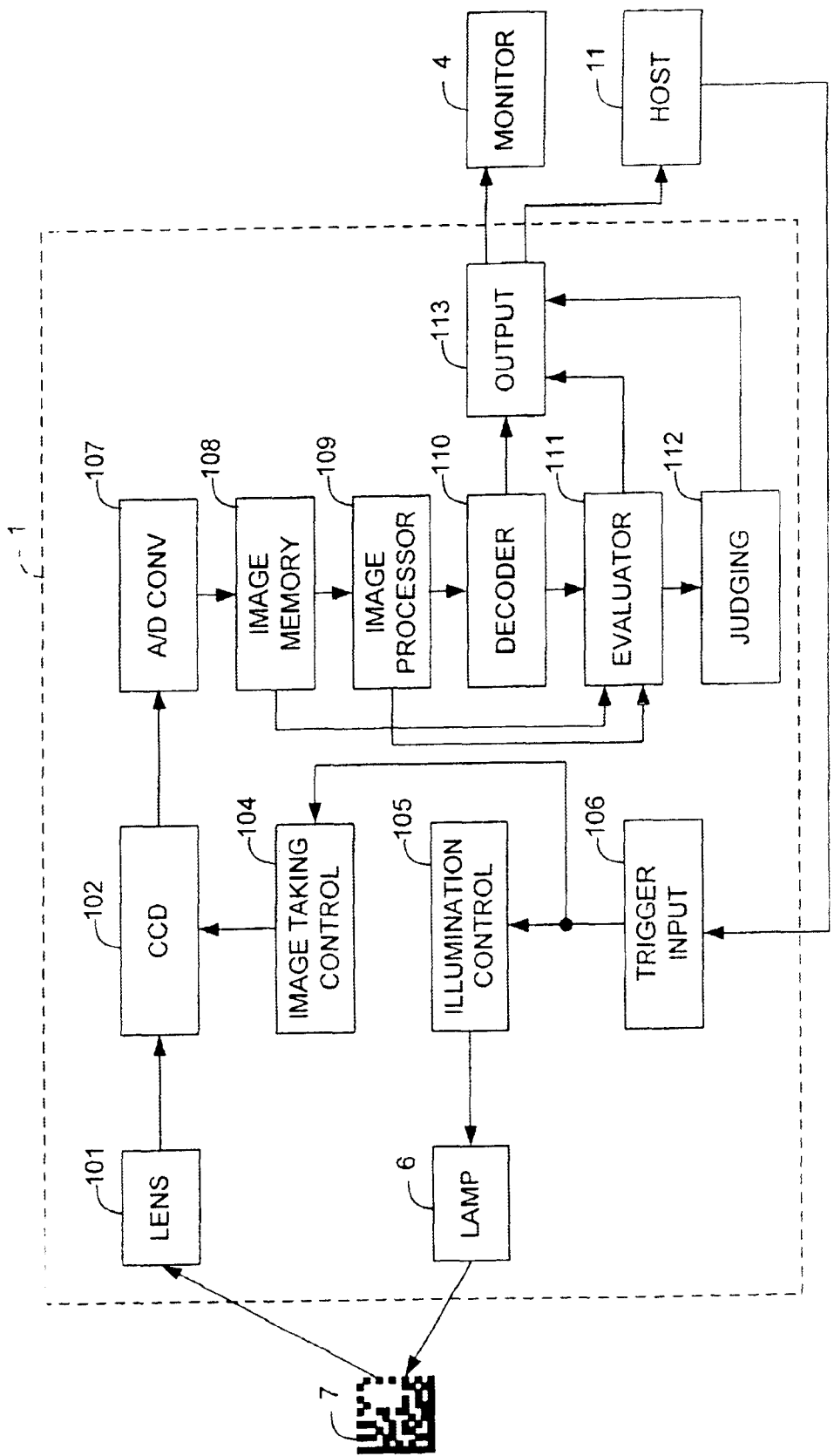
FIG. 1 is a functional block diagram of a two-dimensional code reader embodying this invention.

The invention is described next by way of examples. FIG. 1 shows the structure of a two-dimensional code reader 1, including a lens 101 and an image-taking element (CCD) 102 for obtaining an image of a two-dimensional code 7 and an illumination lamp 6 for illuminating the code 7 to be processed. It is further provided with an image-taking control part 104, an illumination control part 105, a trigger input part 106, an A/D converter part 107, an image memory part 108, an image processor part 109, a decoder part 110, an evaluator part 111, a judging part 112 and an output part 113. Numeral 11 indicates a host system for controlling the operations of this two-dimensional code reader 1. Such a host system may comprise a personal computer or a programmable controller (PLC). Numeral 4 indicates a monitor that may be included as a constituent element of the two-dimensional code reader 1, as will be explained below.

The trigger input part 106 serves to receive from the host system 11 a trigger signal 11 which indicates the start of an image-taking process and is transmitted to the image-taking control part 104 and the illumination control part 105 such that the CCD 102 begins to operate under the illuminated condition by the lamp 6. Image signals from the CCD 102 are converted into digital signals by means of the A/D converter part 107 and are thereafter stored in the image memory part 108. The image processor part 109 extracts the finder pattern from the two-dimensional code 7 from the image data (hereinafter referred to as the "object image") stored in the image memory part 108 and then determines the position and the orientation of the two-dimensional code in the object image on the basis of the result of this extraction. The image processor part 109 also extracts the timing pattern and recognizes the position and the size of each cell within the code on the basis of its arrangement. It also determines whether each cell is black or white by a binary conversion process and also the sizes of the cells.

The decoder part 110 converts the optical data of each cell into symbols on the basis of the processes by the image processor part 109. It also arranges these symbols for each symbol character and judges whether or not there is an error in the values (code words) represented by these symbol characters. If an error is found, it is corrected. After the optical data are decoded, the decoded results are outputted to the output part 113.

The evaluator part 111 makes use of the results of processes by the image processor part 109 and the decoder part 110 to calculate different kinds of evaluation value to be described below about the two-dimensional code which is the object of processing. The judging part 112 makes use of data such as these evaluation values and their averages to judge whether or not the two-dimensional code in the object image is changing in the direction of becoming impossible to decode. The output part 13 receives the results of processing by the decoder part 110, the evaluator part 111 and the judging part 112 and outputs them to the host system 11 and the monitor 4.

Figure 2:
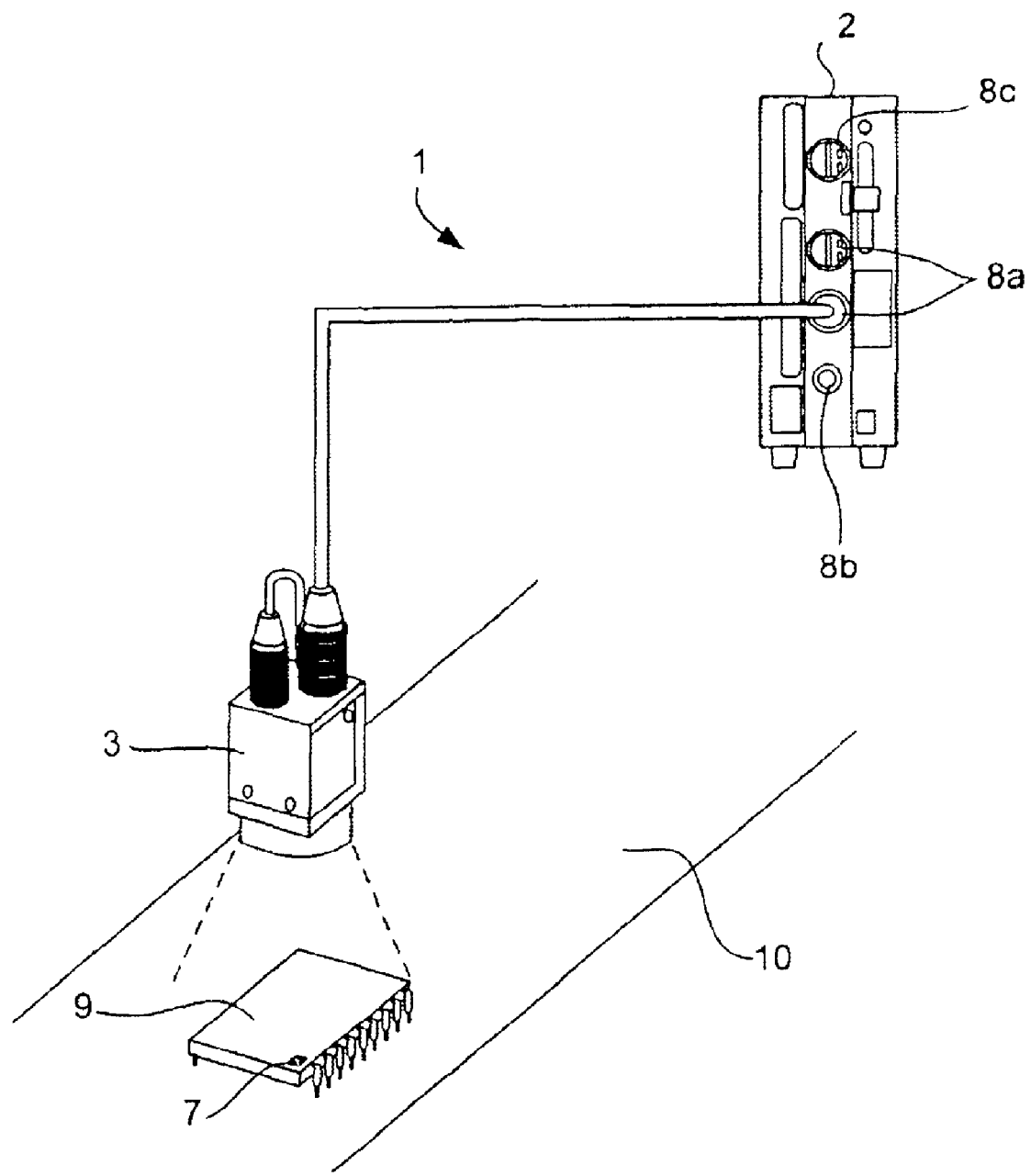
FIG. 2 is an external view of a two-dimensional code reader as it is being used.
Figure 3:
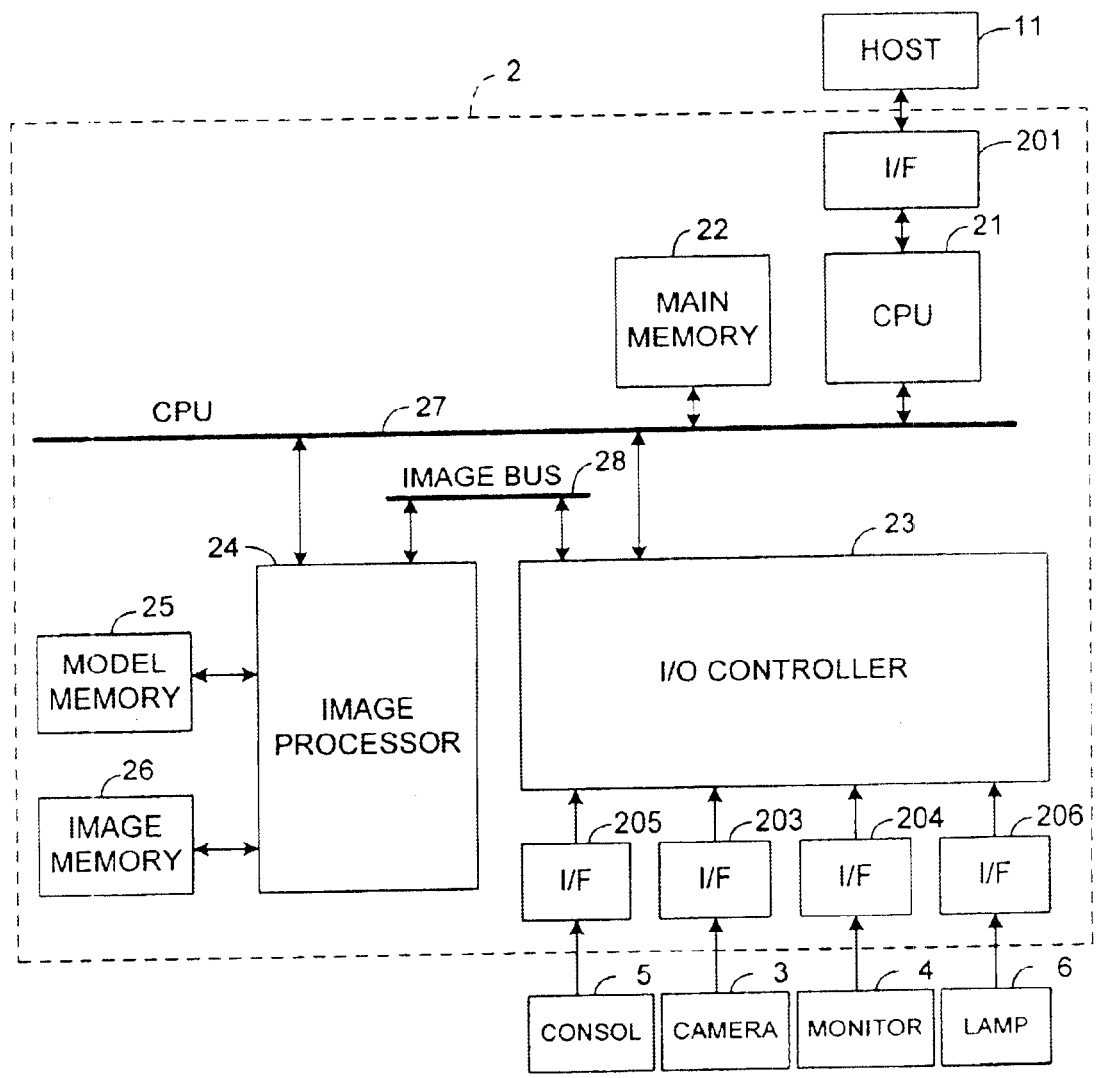
FIG. 3 is a block diagram of the two-dimensional code reader of FIG. 2 for showing its electrical structure.

FIGS. 2 and 3 show how the two-dimensional code reader 1 may be structured, as an example. FIG. 2 shows the two-dimensional code reader 1 as being incorporated into a data managing system for a production line for printed circuit boards and having as its basic constituents a controller 2 containing a computer inside and a CCD camera 3 (hereinafter referred to simply as "camera") connected to this controller 2 through a cable. The controller 2 is provided with two connectors 8a on its front surface for connecting to the camera, as well as other connectors 8b and 8c for connecting the monitor 4 and a consol 5 (shown in FIG. 3). The illumination lamp 6 is contained inside the camera 3.

The two-dimensional code reader 1 thus structured may be set up for the purpose of reading out the two-dimensional code 7 formed by direct marking on the surface of a component 9 to be mounted to a printed circuit board. The camera 3 is set above a conveyor 10 for transporting components, while the controller 2 may be placed somewhere near the conveyor 10 and is connected to the host system 11. The controller 2 operates the camera 3 according to a command from the host system 11 and, after having an image of the two-dimensional code 7 taken, decodes the optical data in the two-dimensional code in this image.

The decoded result which is finally obtained by the controller 2 is transmitted to the host system 11. The two-dimensional code 7 may contain various data necessary for an assembly work such as the kind of the component, the component number, the destination of its delivery and the product number of the board to which it is to be mounted. The host system 11 uses the received data to carry out various controls such as switching the path of the conveyor 10 or transmitting a command to a robot (not shown) for the assembly work.

FIG. 3 shows the hardware structure of the two-dimensional code reader 1, centered around its controller 2. The controller 2 according to this embodiment includes a CPU 21, a main memory 22, an I/O controller 23, an image processor part 24, a model memory 25 and an image memory 26 as its main components. The camera 3, the monitor 4, the consol 5 and the lamp 6 inside the camera 3 are connected to the I/O controller 23 respectively through interface circuits 203, 204, 205 and 206. The aforementioned A/D converter part 107 is contained in the camera interface circuit 203.

The CPU 21 serves to exchange commands and data with the host system 11 through a communication interface circuit 201. The trigger input part 106 shown in FIG. 1 is represented by the function of the communication interface circuit 201 and the CPU 21 to receive trigger signals. The I/O controller 23 and the image processor part 24 are connected to the CPU 21 through a CPU bus 27 and are structured so as to be able to exchange image data between them through an image bus 28. Images outputted from the camera 3 are transmitted from the I/O controller 23 to the image processor part 24 and stored in the image memory 26 which corresponds to the image memory part 108 of FIG. 1. The image processor part 24 serves to read out the images stored in the image memory 26 in response to a command from the CPU 21, delivering them to the I/O controller 23.

The I/O controller 23 can make the monitor 4 to sequentially display the images delivered from the image processor part 24 as well as real-time images inputted from the camera 3. The I/O controller 23 also receives data from the CPU 21 for displaying graphs for showing the changes in evaluation values with time (to be explained below) and causes such graphs to be displayed on the monitor 4.

The main memory 22 not only serves to store programs necessary for the operations of the CPU 21 but also is used for different purposes such as temporarily saving data generated in various processes, remembering evaluation values (to be explained below) and data related to the output of a warning, and sequentially accumulating evaluation index values obtained in the course of a readout process.

The model memory 25 is for registering models that are used for the detection of the finder pattern of a two-dimensional code and is connected not only to the image memory 26 but also to the image processor part 24. The image processor part 24 is provided with a processor dedicated to image processing and digital calculation circuits and corresponds to the image processor part 109 of FIG. 1.

Programs corresponding to the image-taking control part 104, the illumination control part 105, the decoder part 110, the evaluator part 111, the judging part 112 and the output part 113 are stored in the main memory 22 such that the CPU 21 can execute processes based on these programs to enable these parts to carry out their intended functions.

Since this two-dimensional code reader 1 according to this embodiment is required to sequentially read out and output the two-dimensional codes 7 on the components 9 being transported on the conveyor 10, the controller 2 is set so as to rapidly repeat the process of taking in the image of a two-dimensional code 7 by operating the camera 3 and the process of reading out the two-dimensional code of the image. These two-dimensional codes 7 are produced by means of a marking device (not shown) somewhere on the upstream side of the conveyor 10. If parts of this marking device become old and worn, the marking conditions of the two-dimensional codes on the components 9 may gradually deteriorate. Moreover, the condition of the lamp 6 may be deteriorating such that the area for taking images may be becoming darker. If such changes take place, the quality of the two-dimensional codes in the images taken into the controller 2 also deteriorates. If this condition is allowed is continue, the frequency of error correction at the time of decoding is believed to increase. Eventually, the decoding may become impossible and the work of assembling printed circuit boards may become adversely affected.

As a countermeasure, the controller 2 according to this embodiment of the invention is arranged to obtain an evaluation value of the two-dimensional code of the object image every time its image is taken in for carrying out the image processing or the decoding process. In the above, what is referred to as the evaluation value serves to indicate the degree to which the two-dimensional code in an image is suited for a readout process, and the readout process includes not only the decoding process but also the entire series of image processing processes inclusive of the process of taking in image data of a two-dimensional code.

A plurality of evaluation items as shown in FIG. 4 may be prepared such that the user is allowed before the readout process is started to select for processing a warning and the display of graphs. As the readout process is started thereafter, the controller 2 operates to obtain an evaluation value for each of the selected evaluation items regarding each of the object images to be read out (except for those images which could not be decoded). Graphs for showing the changes in the evaluation values over time are displayed on the monitor 4. The controller 2 also serves to compare the evaluation value with a specified warning level. If the condition of the evaluation value becoming less than the warning level occurs more often than a specified number of times, a warning signal is outputted to the host system 11. This process will be hereinafter referred to as the warning output. When the warning output is received, the host system 11 carries out error processes such as stopping the conveyor 10, sounding a buzzer, and stopping the transportation of the products.

Figure 5A:
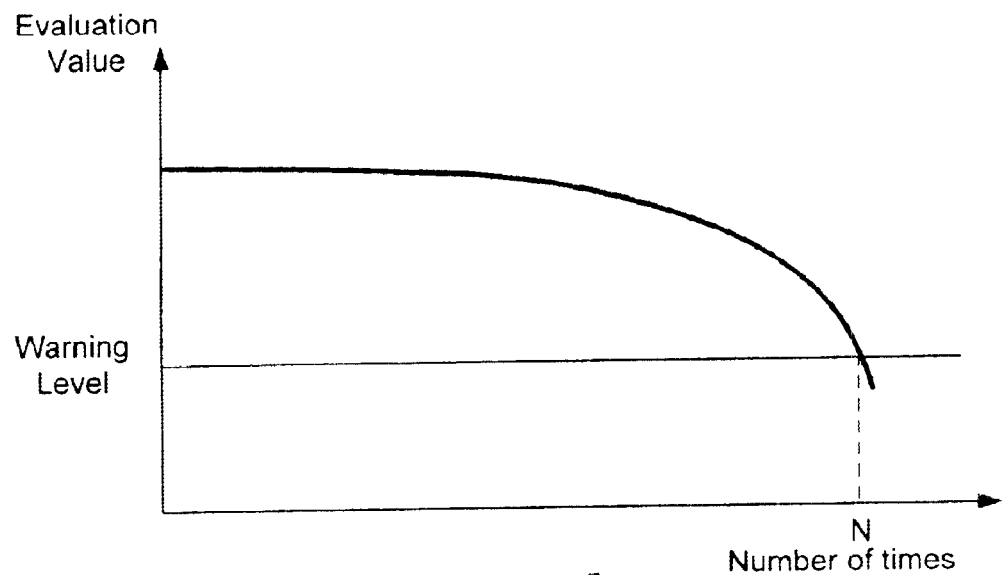
FIGS. 5A and 5B, together referred to as FIG. 5, are examples of a graph for showing changes in evaluation values.
Figure 5B:
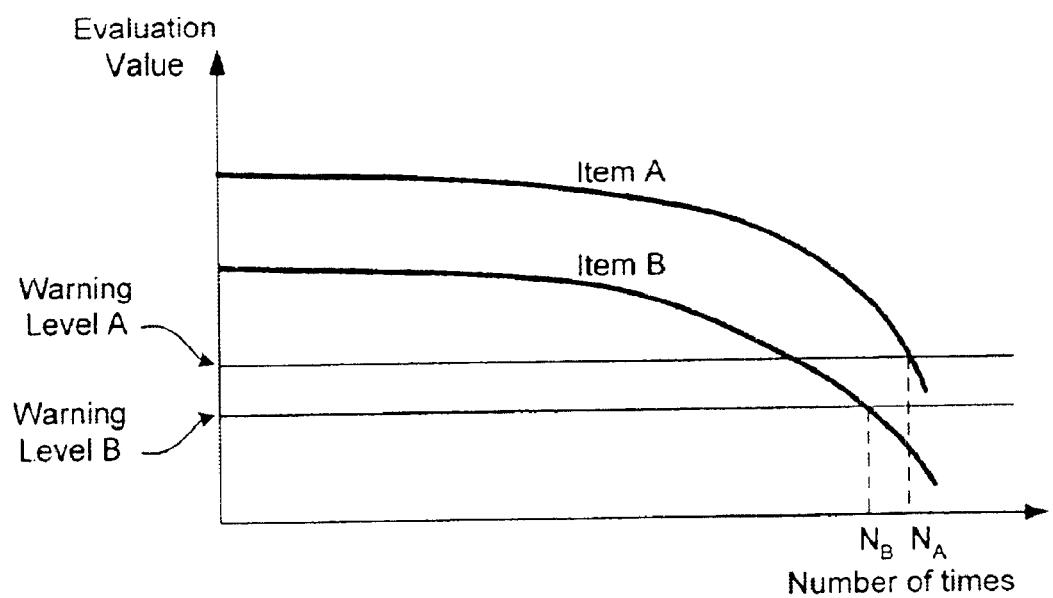

FIGS. 5A and 5B show examples of the display of a graph showing the time-rate of change of an evaluation value. In FIG. 5A, the horizontal axis represents the readout times and the vertical axis represents the level of an evaluation value, showing the past changes in the evaluation value.

Each of the evaluation values shown in FIG. 4 is defined so as to be 100 when the two-dimensional code in the object image is in a good condition and to decrease as the condition approaches the lowest readable limit level. FIG. 5A shows an example wherein the evaluation value begins to become lower at some point in time and the Nth evaluation value reaches the warning level. Thus, the user can keep monitoring the graph to be made aware that the condition of the two-dimensional code is beginning to deteriorate and take an appropriate measure such as replacing worn-out parts of the marking device or the lamp 6. According to the present example, since a warning output is transmitted to the host system 11 after an evaluation value becomes lower than the warning level over a specified number of times, the user may not notice the deteriorating condition from the displayed graph but can still be made aware of the situation from the output from the host system 11.

FIG. 5B shows an example of a display when a plurality of evaluation items (Items A and B in this example) have been selected. Not only the change with time of each evaluation value but also the corresponding warning levels are indicated such that the user can easily ascertain the condition of each item. The graph shows an example where evaluation values for different items are deteriorating at different rates such that the user can select an appropriate measure to be taken corresponding to the given condition.

Next, each of the evaluation items shown in FIG. 4 will be explained.

(1) Accuracy in Extraction of Finder Pattern

The image processor part 24 according to this embodiment of the invention carries out a pattern matching process by carrying out a correlation calculation while scanning a model finder pattern in the model memory 25 on the object image. The process of searching for a finder pattern by pattern matching will be hereinafter referred to as "correlation search". If an image area is found wherein the correlation value with the model pattern is larger than a specified threshold value, the image processor part 24 extracts the image area as the finder pattern. In this correlation search, the position and the orientation of a finder pattern may be determined by carrying out a plurality of scans while rotating the model by specified angles.

Accuracy in extraction of a finder pattern may be expressed by making use of a correlation value obtained in the correlation search. The evaluation value obtained at a position which fits the model at the time of correlation search is expressed in a percentage form to be defined as the evaluation value R. If the finder pattern of the object image is in a good condition like the model, the evaluation value R at the fit position at the time of the correlation search should be high. If the finder pattern has become distorted or the variations in the density pattern of the finder pattern has become large, say, because of the deformed condition of the parts of the marking device, the evaluation value R will become smaller.

(2) Reliability of Extracted Finder Pattern

For this evaluation item, evaluation value $FN_{rat}$ is calculated by applying the number of extracted finder patterns FN in Formula (A) given below:

$$FN_{rat}=100\times(FN_{max}-FN+1)/FN_{max}. \quad \text{Formula (A)}$$

Since the two-dimensional codes that are continuously being transported on the conveyor 10 must be sequentially read out, a specified maximum length of time is preliminarily set for each readout process. In Formula (A), $FN_{max}$ indicates the maximum possible number of decoding processes that can be carried out during this specified length of time.

According to Formula (A), the evaluation value $FN_{rat}$ takes its maximum value of 100 when the number of extracted finder patterns FN is 1 and decreases as FN increases. $FN_{rat}$ is defined to be 0 if FN exceeds $FN_{max}$.

The two-dimensional code reader 1 according to this embodiment is adapted to obtain an image of one two-dimensional code at a time to carry out a readout process. Thus, there should normally appear only one finder pattern on the image. If parts of the marking device have deteriorated sufficiently, a pattern may appear on portions of a two-dimensional code other that its write-in areas. The code may be damaged in parts, or a shadow may be cast due to a defect in the lamp such that a noise with a shape similar to the finder pattern may appear on the image. In such a case, the noise may be extracted as a candidate for the finder pattern.

If a plurality of candidates for a finder pattern are extracted, the CPU 21 carries out a decoding process for each of the extracted candidates and eliminates each candidate that fails to be decoded. Thus, it is possible to finally output a decoded result of the correct finder pattern. Since a specified upper limit is set for the processing of each readout process, as explained above, time may become wasted for the correlation search for the finder pattern if there are many noises. As a result, there may be a shortage of time for carrying out the decoding process on the correct two-dimensional code and a correct readout result may fail to be obtained.

Evaluation value $FN_{rat}$ by Formula (A) becomes smaller as the number of noise increases. Thus, if the calculated value of $FN_{rat}$ is shown together with a specified warning level as shown in FIG. 5, it can be judged easily whether or not there is a possibility of the noise increasing such that it may become impossible to read out the two-dimensional codes.

(3) Decoding Accuracy

For this evaluation item, evaluation value Er is calculated by substituting in Formula (B) given below the ratio P (hereinafter referred to as the error correction ratio) at which corrections of errors were made in code word at the time of the decoding process, that is, the quotient obtained by dividing the number Cw of code words having an error corrected by the maximum number $Cw_{max}$ of code words that could be corrected:

$$Er=100\times(1-P) \quad \text{Formula (B)}$$

If the two-dimensional code in the object image is in a good condition, the probability of making an error in distinguishing between black and white becomes smaller and hence the value of Er becomes larger. On the other hand, if the ratio P becomes large because of the deterioration in the condition of the marking or the reduced quantity of the illuminating light, the value of Er will become smaller.

(4) Cell Size

Figure 21A:
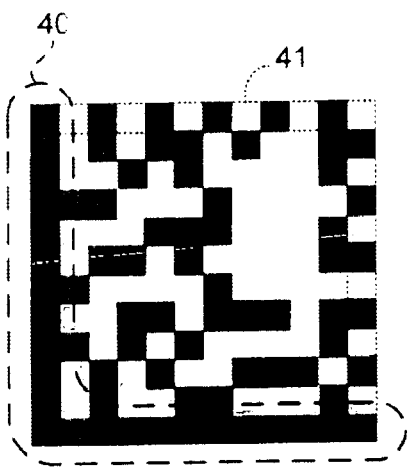
FIGS. 21A and 21B, together referred to as FIG. 21, show representative examples of two-dimensional codes, as well as examples of finder and timing patterns in such codes.
Figure 21B:
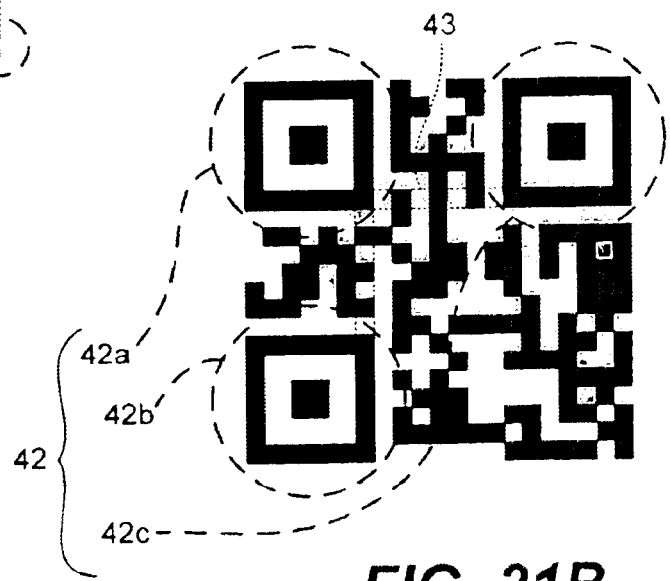

Evaluation according to this item is carried out by using image data of a timing pattern. As shown in FIG. 21, the timing pattern is a pattern of black and white cells placed alternately both in the horizontal and vertical directions and is used for identifying the position of each cell in the code.

Figure 6:
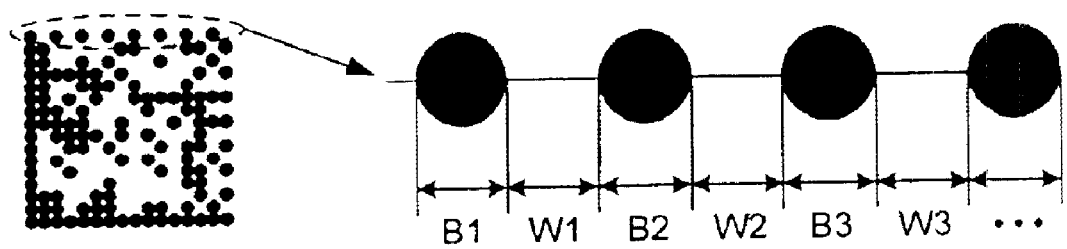
FIG. 6 shows a method of extracting parameters for evaluating the cell size.

This evaluation item is particularly suited for evaluating the condition of two-dimensional codes by stamp marking. By this method, a pin is stuck at each position corresponding to a black cell to form a circular indentation on the surface of a product. Since the circular indentations thus formed are usually identified as black cells, the two-dimensional code is shown as an arrangement of black cells as dots. FIG. 6 shows an example of such a timing pattern which will be identified by sequentially detecting the width $B_n$ and $W_n$ (n=1, 2, 3 . . . ) of cells in the direction of the timing pattern and then obtaining the average widths B and W of the black cells and the white cells. Evaluation value S is calculated by using Formula (C) given below:

$$S=100\times\{2B/(B+W)\} \quad \text{Formula (C)}$$

if B<W and Formula (D) given below:

$$S=100\times\{2-2B/(B+W)\} \quad \text{Formula (D)}$$

if B≧W. By either Formula (C) or (D), evaluation value S takes the maximum value of 100 when B=W and the value of S becomes smaller as the difference between B and W becomes larger.

Figure 7:
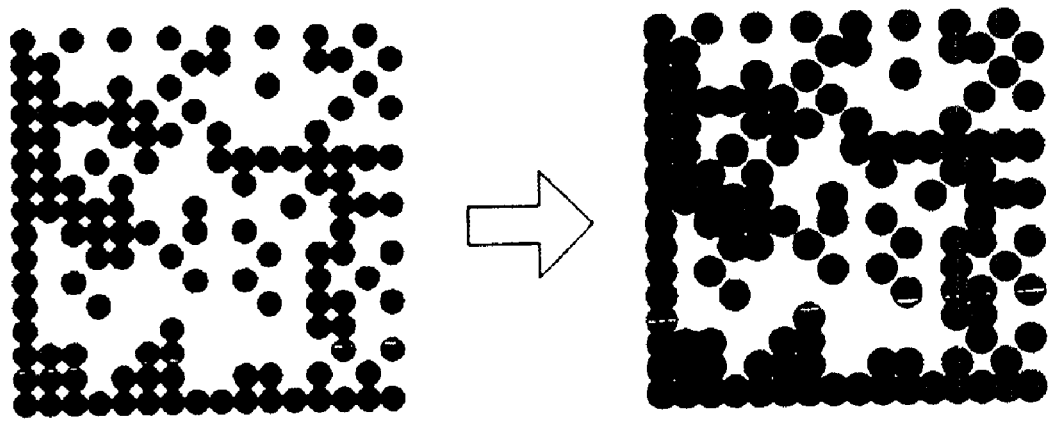
FIG. 7 shows an example of how cell size may change.

If the pin used for the marking is in a good condition, the image of a two-dimensional code formed thereby will look as shown in FIG. 7A, the dots corresponding to black cells being distributed with intervals equal to the intervals between the original cells. If the pin is worn after a repeated use, black cells become enlarged and portions of white cells become invaded as shown in FIG. 7B and it becomes difficult to identify the white cells. If the change is so as to reduce the size of the black cells, on the other hand, the white cells consequently grow larger and the black cells may be difficult to identify. According to Formula (C), the value of S becomes smaller as the black cells become smaller. According to Formula (D), the value of S becomes smaller as the black cells become larger. Thus, evaluation value S can make it possible to accurately detect the change in the size of the cells.

(5) Image Contrast

For this evaluation item, evaluation value C1 is calculated by using image data within an area on the inner side of the timing pattern. This is a data display area where detailed data are encoded. Since the coordinates of all cells inside the code are already extracted on the basis of the timing pattern, the image processor part 24 is capable of reading out the density value corresponding to each cell within the data display area from the image memory 26 and using it for the calculation of the evaluation value. According to the instant example, after the density value of each cell is extracted, average density values $Q_B$ and $Q_W$ respectively of the black and white cells are obtained, and these values are substituted into Formula (E) given below to calculate evaluation value C1:

$$C1=100\times|Q_W-Q_B|/T \quad \text{Formula (E)}$$

where T is a number corresponding of the gradation of the image data. If the image data are 8-bit data, for example, T=256. The gradation is herein defined as increasing in the direction from the black level to the white level.

Figure 8:
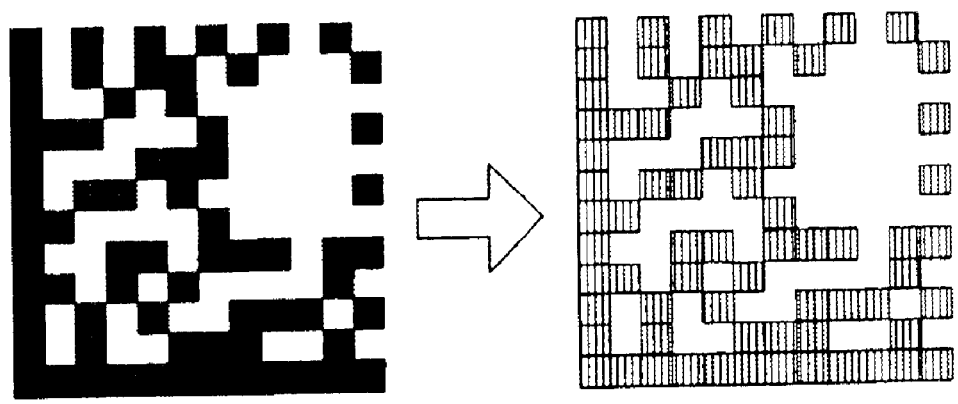
FIG. 8 shows an example of how image contrast may change.

According to Formula (E), evaluation value C1 becomes smaller as the difference between $Q_B$ and $Q_W$ becomes smaller, that is, as the contrast of the image becomes weaker. If a two-dimensional code is formed by means of a marking device using the laser marking method, a pattern of black cells is formed by exposing the parts corresponding to black cells to laser light but if the laser diode has become old and the intensity of the laser light has diminished, it may become incapable of showing black cells clearly. In such a case, an image is obtained as shown in FIG. 8 with the density of the black cells becoming large and the contrast becoming weak. Such a situation is easily detectable by using Formula (E).

If the illumination becomes weak and the image becomes darker, the density values of the white cells become smaller. Such a situation, too, can be easily detected by Equation (E). If the effects of changes in illumination are considered important, not only the image corresponding to the cell but also the image of the background of the two-dimensional code may preferably be included in the calculation element for evaluation value C1.

(6) Ratio of Defective Cells

Figure 9:
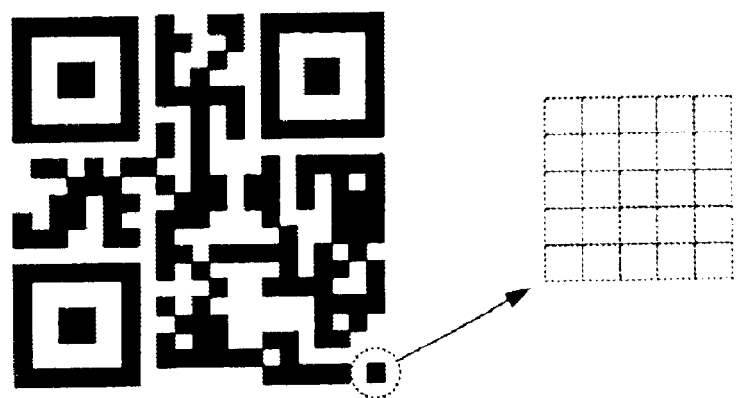
FIG. 9 shows the relationship between a cell and pixels.

For this evaluation item, evaluation value C2 is calculated, as in the case of (5) above, by using the image data of each cell in the data display area and their decoded results. In this process, a minimum value $W_{min}$ among the density values of the white cells is extracted. Next, the density values of the black cells are sequentially compared with this extracted minimum value $W_{min}$ and the cells with values greater than $W_{min}$ are extracted. The evaluation value C2 is calculated by substituting into Formula (F) given below the final number U of the black cells extracted;

$$C2=100\times(1-U/M) \quad \text{Formula (F)}$$

where M is the total number of the cells of the two-dimensional code and the identification of the black cells and the white cells is according to the results of the final judgment after errors are corrected. Since each cell of a two-dimensional code, when appearing as an image, consists of a plurality of pixels as shown in FIG. 9, it is preferable in the aforementioned process of comparing each black cell with $W_{min}$ to compare the maximum density value among the black cells or the average density value with $W_{min}$.

If the density value of a black cell is larger than the minimum density value $W_{min}$ of the white cells, this means that the relationship between the density values of black and white cells has already been inverted. If the lamp 6 is very old and a shadow is formed on a portion of the area, such an inverted relationship may take place. Such an inversion phenomenon can be corrected by the decoding process such that optical data can be correctly decoded, but there is a limit to how effective such a correction can be.

Formula (F) shows that evaluation value C2 becomes 100 when U=0. It also shows that evaluation value C2 becomes smaller as the value of U becomes larger, or as the ratio of inversion phenomenon increased.

Since the aforementioned error correction ratio P shows only the ratio of error correction in units of code words, it is difficult to obtain the occurrence frequency of to errors in units of cells with evaluation value Er alone. By contrast, Formula (F) can be used to obtain an evaluation value reflecting the ratio of erroneous identification regarding the individual cells inside the data display area. Thus, the margin of safety in the decoding process can be more precisely judged if both evaluation values Er and C2 are obtained.

(7) Pixel Distribution in Cell

Figure 10A:
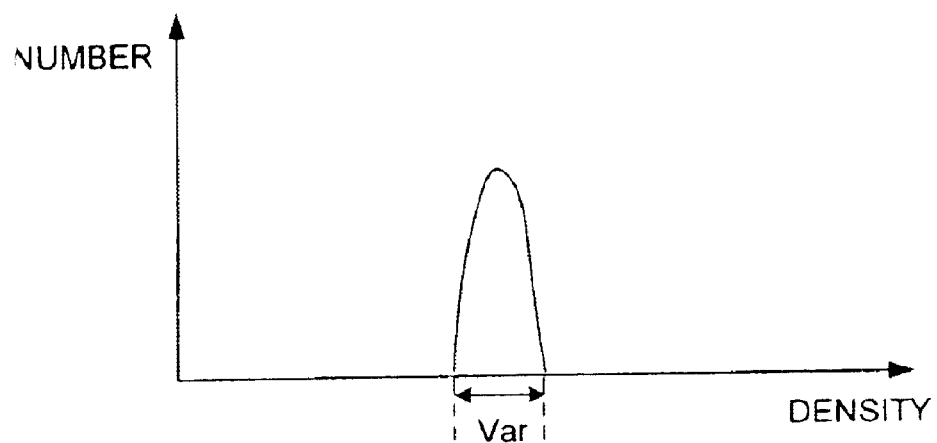
FIGS. 10A and 10B, together referred to as FIG. 10, each show how dispersion inside a cell may be obtained.

For this evaluation item, evaluation value V is calculated by using the image data of a specified cell within the two-dimensional code. As explained above, each cell of a two-dimensional code consists of a plurality of pixels in an image. A histogram of density distribution is prepared as shown in FIG. 10A for these pixels and evaluation value V is calculated by substituting the width (dispersion) Var of the histogram into Formula (G) given below:

$$V=100\times 1/Var \quad \text{Formula (G)}$$

In the above, the dispersion value Var need not be obtained from just one cell. Dispersion values may be obtained from a plurality of cells and their average may be substituted into Formula (G).

Figure 10B:
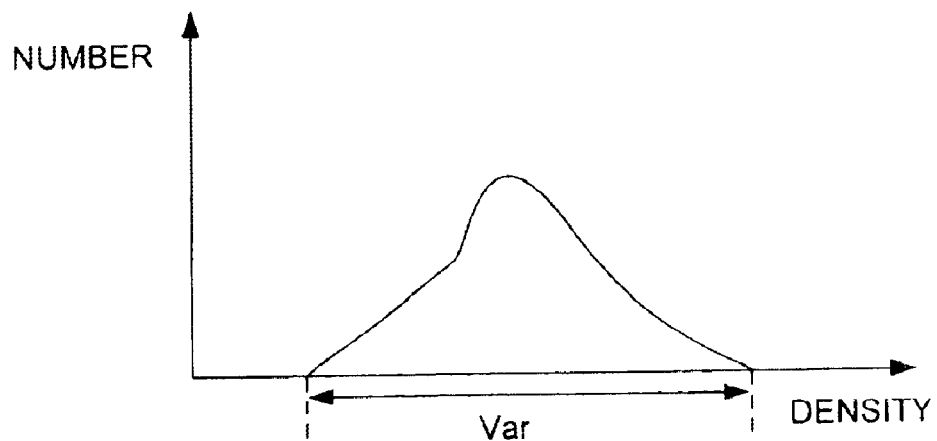

For being able to accurately distinguishing between black and white cells, it is preferable that the variations be small in the density of the pixels within the cell. According to Formula (G), evaluation value V takes its maximum value of 100 when the density of the pixels within the cell is completely uniform and hence Var=1 and becomes smaller as the dispersion Var becomes larger as shown in FIG. 10B. Thus, a change into a condition as represented by FIG. 10B due to the worn condition of parts of the marking device or the aging of the lamp 6 can be easily detected from evaluation value V.

Figure 11:
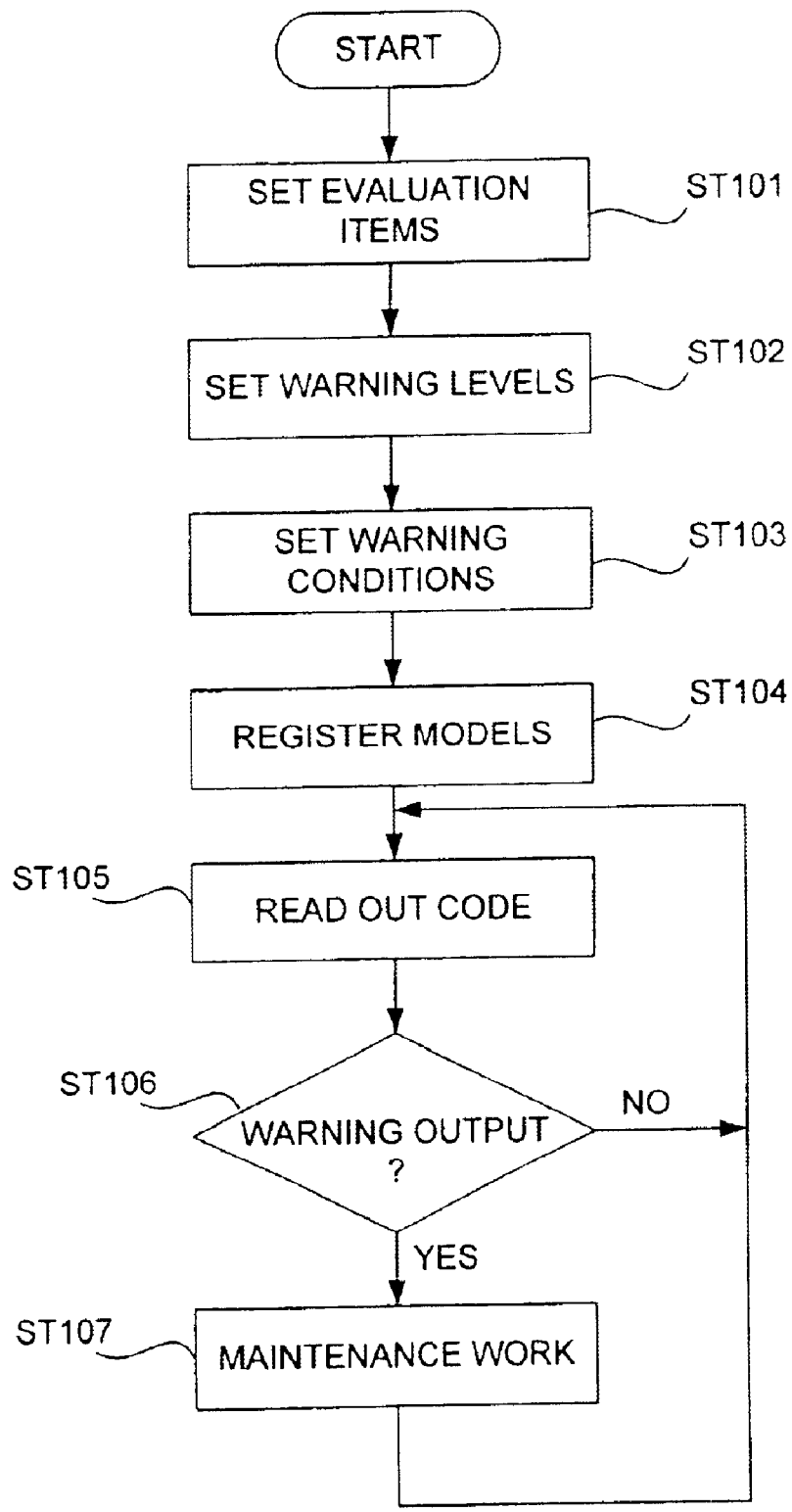
FIG. 11 is a flowchart for the user's operations.

FIG. 11 shows the routine by which the two-dimensional code reader 1 described above is operated by a user. Firstly, when the apparatus is put in use, the camera 3 and the controller 2 are positioned appropriately, and the monitor 4 and the consol 5 are connected to the controller 2. When this setting operation is completed, an initialization screen inclusive of the list of evaluation values shown in FIG. 4 is displayed on the monitor 4. The user may make use of the consol 5, for example, to select desired evaluation items and register them on the controller 2 (Step ST101).

Next in Step ST102, a warning level is set for each selected evaluation item. If a default warning level is already set in the controller 2 for each evaluation item, such default values may be displayed on the monitor 4 such that the user can confirm it or modify it. An evaluation value may be obtained from a model image (to be explained below) such that a value which is lower than it by a specified level may be automatically set.

In Step ST103, a condition for executing a warning (hereinafter referred to as the warning condition) is set. According to the instant example, conditions under which an evaluation value becomes lower than its warning level are defined as a faulty condition, and a number of occurrences of such a faulty condition is specified for each evaluation item such that a warning output is made when the specified number of faulty conditions have occurred. This is because the purpose of this two-dimensional code reader 1 is to detect changes with time of two-dimensional codes caused by the deterioration of parts of the marking device or the lamp 6 and it is desirable that no warning be outputted in the case of an accidental change of the kind that would occur only once.

After the settings related to image evaluation are completed, models are registered in Step ST104 and an image of a model two-dimensional code is taken in an image-taking area. A finder pattern is extracted from the obtained image of the model.

Thereafter, the setting of the controller 2 is completed, say, by operating on the consol 5 and a readout process on a two-dimensional code is started (Step STR105). If a warning is outputted after a specified length of time has elapsed (YES in Step ST106), the user identifies a faulty part, for example, on the basis of a graph displayed on the monitor 4, and carries out a maintenance work such as the replacement of the faulty parts with new ones (Step ST107).

Although the routine shown in FIG. 11 returns to the readout process right after the maintenance work in Step ST107 is completed, it is not necessary to stop the readout process of Step ST105 as soon as a warning is outputted since the output of a warning does not mean that readout process can no longer be carried out. If it is arranged to have the maintenance work done during a pause between operation processes, it is possible to return to a normal condition so as to be able to obtain good images without stopping the transportation line at the time of actual operation.

Figure 12:
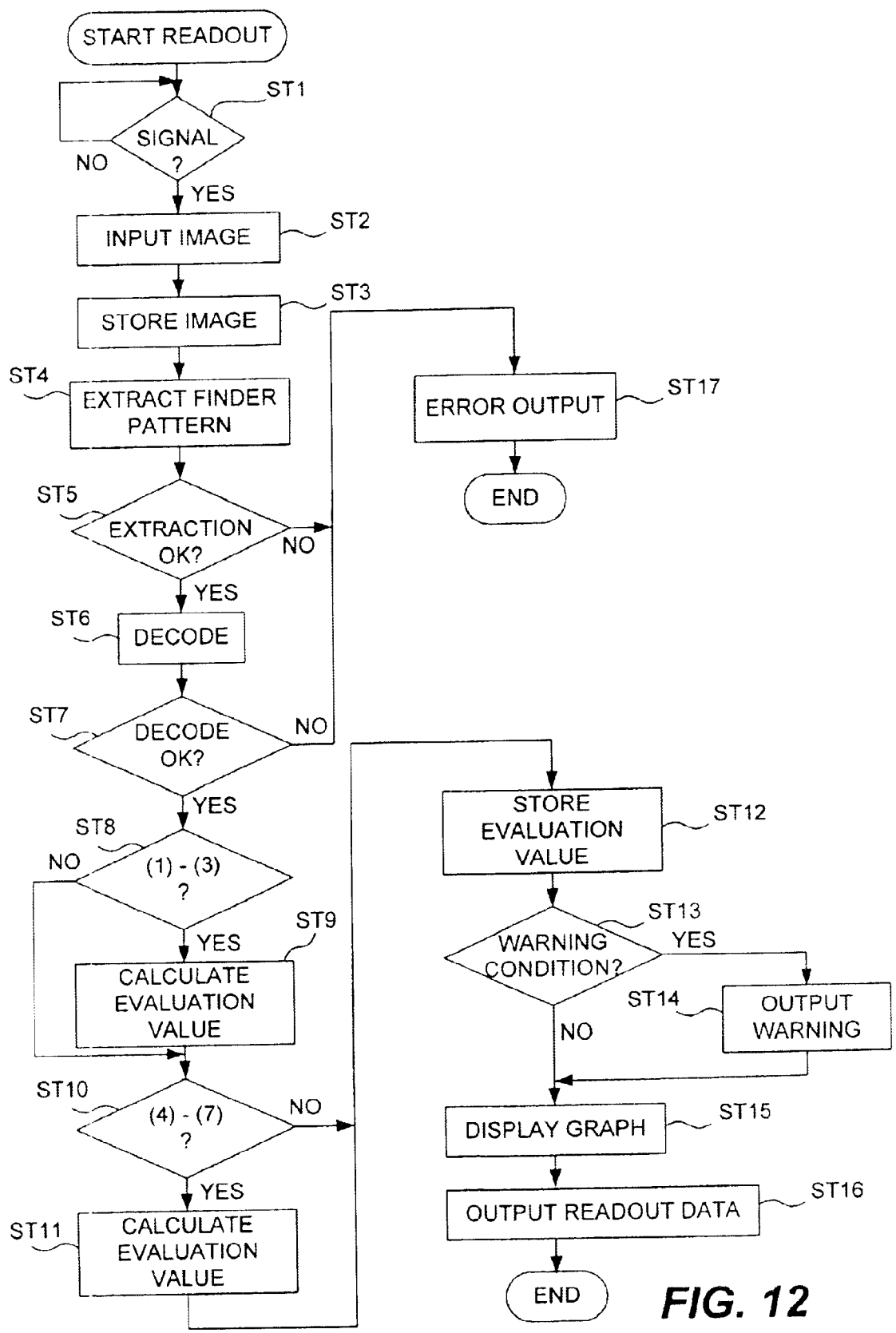
FIG. 12 is a flowchart for the processing by the controller in the readout process.

FIG. 12 shows the routine for reading out the image data of a two-dimensional code with the controller 2 described above.

As a readout start signal for starting the readout process is received from the host system 11 (YES in Step ST1), the camera 3 is operated to obtain an image of the two-dimensional code to be processed (Step ST2). The image obtained by the camera 3 is transported to the image processor part 24 through the I/O controller 23, as explained above, and then stored in the image memory 26 (Step ST3). Next, the image processor part 24 carries out a correlation search on the image stored in the image memory 26 by using a model in the model memory 25 and extracts a finder pattern (Step ST4). The correlation value and the number of extraction obtained by this correlation search are transmitted from the image processing part 24 to the CPU 21 and temporarily stored in the main memory 22.

Figure 13:
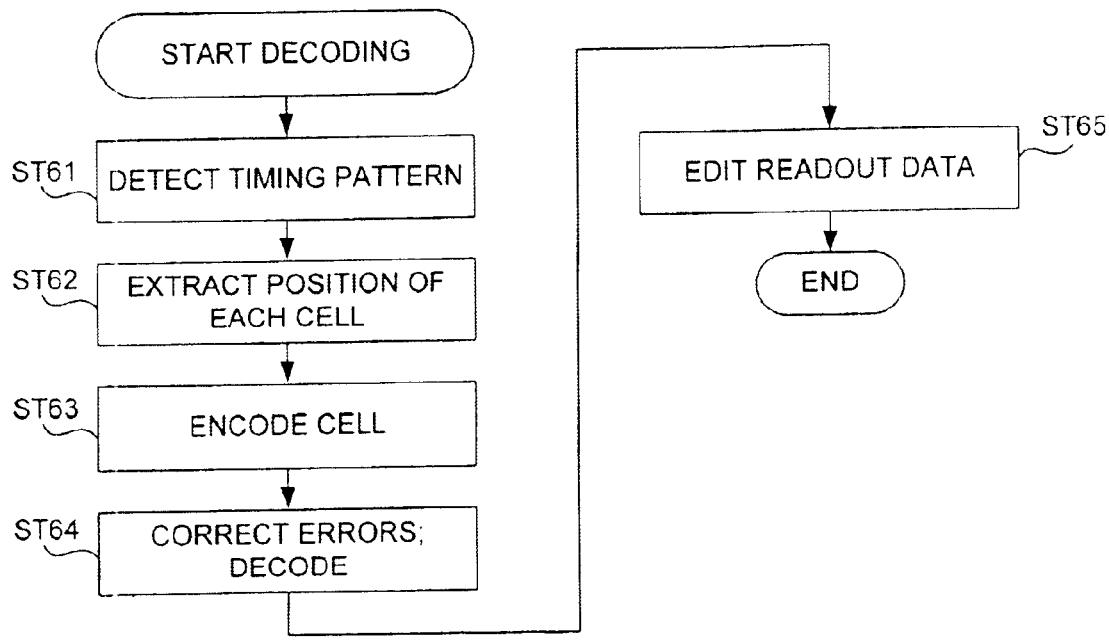
FIG. 13 is a flowchart for the decoding process.

If the extraction of a finder pattern is successful (YES in Step ST5), a decoding process is started (Step ST6) as shown in FIG. 13. In this process, the timing pattern is detected first (Step ST61) and thereafter the position of each cell in the code is extracted on the basis of the results of this detection (Step ST62). For each cell, it is determined whether it is a black cell or a white cell, say, by carrying out a binary conversion of the density value at the position of extraction. On the basis of this determination, optical data represented by each cell are encoded (Step ST63). Next, the encoded symbols are decoded while an error correction process is carried out (Step ST64). Next, the readout data in the final format arranging the results of the decoding are edited (Step ST65). The edited readout data and the error correction ratio P obtained in Step ST64 are temporarily stored in the main memory 22.

If the decoding or the extraction of a finder pattern failed (NO in Step ST7), an error signal is outputted to the host system 11 to indicate the failure (Step ST17) and the process is terminated. If the series of readout processing is carried out without any trouble and the decoding is successful (YES in Step 7 of FIG. 12), the routine proceeds to the process of calculating an evaluation value. If the selected evaluation item is (1), (2) or (3) described above (YES in Step ST8), the evaluation value is calculated by using the necessary data temporarily saved in the main memory 22 (Step ST9). If the selected evaluation item is (1), the correlation value obtained by the aforementioned correlation search for the finder pattern is converted into a percentage form to obtain evaluation value R. If the selected evaluation item is (2), the extraction number FN of the finder pattern FN is used to calculate evaluation value $FN_{rat}$. If the selected evaluation item is (3), the error correction ratio P obtained in Step ST64 is used to calculate evaluation value Er.

If the selected evaluation item is (4)-(7) (YES in Step ST10), the image processor part 24 reads out from the image memory 26 the image data corresponding to the individual cells and a parameter for Formula (C), (D), (E), (F) or (G) is obtained. The obtained parameter is used to calculate evaluation value S, C1, C2 or V (Step ST11).

Once the evaluation value corresponding to the selected evaluation item is thus obtained, it is stored in a specified saving area of the main memory 22 (Step ST12) and then compared with the warning level. If any of the obtained evaluation values (if more than one evaluation item has been selected) satisfies the warning condition set in Step ST103 of FIG. 11 (YES in Step ST13), the output of a warning is executed (Step ST14). Independent of whether or not the warning output is executed, the obtained evaluation value is used to update the display of the graph on the monitor 4 (Step ST15). Thereafter, the readout data that have been edited in the aforementioned decoding process are transmitted to the host system 11 (Step ST16).

Thus, every time the readout process is carried out on a two-dimensional code, an evaluation value corresponding to each of the selected evaluation items is calculated and the corresponding graph showing the history of change of that evaluation value is displayed in an updated form. Moreover, if a condition with an evaluation value below the warning level occurs a specified number of times, a warning output is transmitted to the host system 11.

By a routine as described above, since the readout process on the two-dimensional code itself has been successful even though a warning process is also carried out, there is no danger of causing any trouble in the operation by the host system 11 by outputting the readout data. Since any faulty condition can be eliminated by the maintenance work after the warning is outputted, one can avoid the possibility of continuously using a deteriorating marking device until it becomes impossible to read out two-dimensional codes. Thus, generation of wasteful products and frequent occurrence of errors in the assembly work can be effectively prevented and the readout process on two-dimensional codes can be carried out smoothly.

It should be noted that the user can select any number of the evaluation items, depending on the kind of the marking device being used and the condition of illumination. If a plurality of evaluation items are selected, those of the items particularly pertinent to an outputted warning can be clarified. This makes it easier to determine the cause of the deterioration of images and to take an adequate countermeasure.

The invention is described next by way of another embodiment which is structurally similar to the first embodiment described above but is different in the method of calculating evaluation values and the subsequent processes to be carried out. Thus, no detailed description of its hardware structure will be presented. Only details of the processes different from the first embodiment will be explained.

The method according to the second embodiment of the invention may be characterized as using edge points and the direction of density gradients on the image, instead of a correlation search of the kind described above, for extracting a finder pattern. To briefly explain this method, a differentiation process is carried out firstly in order to extract edge points and then a line segment of a specified length is set at each extracted edge point in the direction perpendicular to the density gradient (in the direction from black to white).

Since black cells become a dot pattern in the case of a two-dimensional code produced by the stamping method, the line segments thus prepared at the edge points on a contour dot line may be considered to approximate its tangent line. Since black cells are arranged in an L-shape to form the finder pattern of a data matrix, it may be concluded that these line segments overlap most completely in the direction of arrangement of these black cells. Based on this principle, image areas are extracted according to this embodiment of the invention such that the degree of overlapping among the line segments prepared at every edge point becomes greater than a specified value and the one most resembling the shape of the finder pattern is extracted, and the position and the orientation of the finder pattern are determined.

According to this embodiment of the invention, six evaluation items are prepared as shown in FIG. 14 and evaluation values are obtained for them every time a two-dimensional code is processed. These evaluation values are compared with the warning levels also shown in FIG. 14 and if any of them becomes smaller than the corresponding warning level, a comment (such as also shown in FIG. 14) may be displayed on the monitor 4 and warning data may be outputted to the host system 11.

Next, these evaluation items and methods of calculating the evaluation values shown in FIG. 14 are explained sequentially. In the following explanation, it will be assumed that 8-bit image data are processed and the formulas are as shown in FIG. 14.

(1) Light (Li)

For this evaluation item, evaluation value Li is calculated by Formula (a) because the contrast condition of a two-dimensional code in an object image may be considered to represent an appropriate lighting condition. The contrast is calculated from the image data of black and white cells after errors have been corrected in the decoding process. In Formula (a), "w" indicates the smallest of the density values of the cells identified as a white cell and "b" indicates the largest of the density values of the cells identified as a black cell.

In aforementioned Formula (E), density values between black and white cells were normalized according to gradation and used as the contrast evaluation value. In this embodiment of the invention, by contrast, it is premised that the density value on an image is at least about 50 (as a result of shot noise of the CCD) and it is arranged such that the evaluation value will change within the range of 1–100 for anticipated changes in the contrast.

Explained more in detail, contrast is considered to be sufficient if (w-b) is 200 or greater but that it may be impossible to distinguish a cell if (w-b) becomes as low as 10. According to Formula (a), evaluation value Li=100 when (w-b)=200 and Li=1 when (w-b)=10.

The warning level related to evaluation value Li is set at 6, that is, a warning will be outputted when (w-b) becomes 20 or smaller. If evaluation value Li reaches this warning level, a comment is usually displayed to the effect that there may be an error in the lighting. If the value of "w" is less than 50 in this situation, however, another comment is displayed to request that the lighting be made lighter. If the value of "b" has reached 255, on the other hand, a display is made to request that it be made darker.

(2) Focus (Fc)

Evaluation variable Fc for this evaluation item represents how appropriately the camera 3 is focused. In the instant example, the result of the image processing on the timing patterns is used to extract the magnitude E of the range within which the density value varies between black and white cells and this value is substituted into Formula (b) shown in FIG. 14. Explained more in detail, E is obtained by differentiating the image of a timing pattern twice (second-order differentiation, or by differentiating the first-order differentiation). In the example, since the first-order differentiation is already carried out for identifying the arrangement of the cells in the timing pattern, this result may be taken out of the main memory 22 for carrying out the second differentiation.

Figure 15:
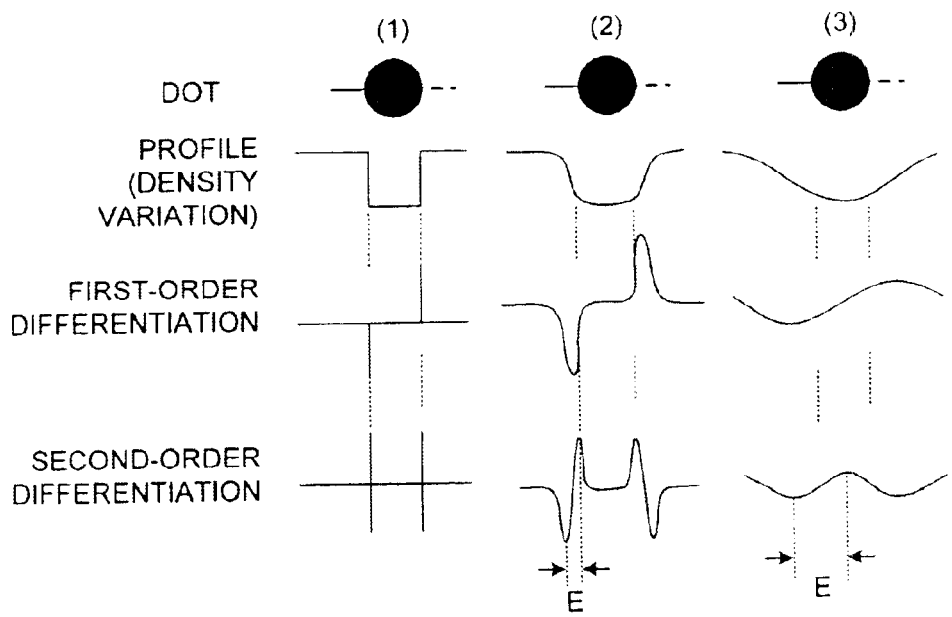
FIG. 15 is a drawing for showing a method of extracting parameter E used in a formula for focusing evaluation.

FIG. 15 shows three examples (1), (2) and (3) of density variation in the direction of arrangement of a timing pattern caused by different focusing adjustments. All three examples relate to an arrangement consisting of three cells with a black cell sandwiched between two white cells but the density varies differently in the direction of the alignment in the three situations and the results of both first-order differentiation and second-order differentiation are shown. The direction of change in density is taken to be downward when it is from white to black and upward when it is from black to white.

In FIG. 15, Example (1) is a situation where the focusing is optimally adjusted such that the changes extracted by the first-order differentiation have hardly any width and the turning points in the positive and negative directions in the second-order differentiation appear nearly at the same position in the direction of arrangement of the cells. As the focus adjustment becomes from bad (as in Example (2)) to worse (as in Example (3)), the widths of density change between cells become larger and the separation between the turning points in the second-order differentiation also becomes larger.

In the instant example, evaluation value E is defines as the number of pixels corresponding to the distance between the turning points in the positive and negative directions in the second-order differentiation, as shown in FIG. 15. In Formula (b), "C" indicates the number of pixels representing the pitch of the cells and is hereinafter referred to as the cell size. Cell size C is equal to S/M where S is the code size (the number of pixels corresponding to one side of the two-dimensional code on the image) and M is the symbol size (the number of cells corresponding to one side of the two-dimensional code). The code size S is measured for the purpose of distinguishing the subsequent cells when the finder pattern is extracted and stored in the main memory 22. The symbol size M is preliminarily inputted by the user on the basis of the specification of the object two-dimensional code and is also registered in the main memory 22.

According to Formula (b), evaluation value Fc becomes 100 when E=2. Where a black cell and a white cell are next to each other, evaluation value E becomes 2 if variation in density takes place only at the outermost pixels of both the black and white cells. In the instant example, the situation where E becomes equal to C is considered to be the worst condition such that evaluation value Fc becomes equal to 1 in such a case. The situation where it is smaller than the worst case by one pixel (where E=C−1) is selected as the warning level at which a comment is to be displayed to the effect that the focusing is then not proper.

(3) Marking (Mk)

Evaluation value Mk for this evaluation item represents the degree of accuracy in identifying a cell. In the instant example, candidate evaluation values are obtained by Formulas (c1), (c2) and (c3) from a display area inside a finder pattern and a timing pattern and the smallest of them is used as evaluation value Mk.

Formula (c1) is for obtaining an evaluation value for a data display area. In Formula (c1), CD is the number of cells where an error correction has been carried out and $CD_{max}$ is the number of cells where an error correction could have been carried out. This maximum number $CD_{max}$ is equal to the product of aforementioned number $Cw_{max}$ of code words which can be corrected for an error and the number of cells per one code word (such as 8), or $CD_{max}=8CW_{max}$.

Formula (c2) is for obtaining an evaluation value for a finder pattern. In Formula (c2), CF is the number of cells that could not be identified as a cell corresponding to the finder pattern during the process for extracting the finder pattern and $CF_{max}$ is the number of cells that could have failed to be identified as such.

Formula (c3) is for obtaining an evaluation value for a timing pattern. In Formula (c3), CT is the number of cells for which a wrong black-or-white judgment was rendered in the process for identifying cells of a timing pattern and $CT_{max}$ is the number of cells for which such a judgment error could have been made.

If all cells of a two-dimensional code have been correctly identified, CD, CF and CT all become zero and evaluation value Mk becomes 100. As the number of incorrectly identified cells increases, evaluation value Mk becomes smaller. If any of CD, CF or CT becomes equal to the corresponding maximum value $CD_{max}$, $CF_{max}$ or $CT_{max}$, evaluation value Mk becomes zero.

The evaluation value when any of CD, CF or CT becomes less than its maximum value $CD_{max}$, $CF_{max}$ or $CT_{max}$ by 1 is defined as the warning level. When evaluation value Mk becomes smaller than this warning level, a comment to the effect that there is a cell that cannot be identified.

Evaluation value Mk indicates the degree of erroneous identification in units of cells not only for a data display area of a two-dimensional code but also for the two-dimensional code as a whole. Thus, it is considered to reflect the quality of the two-dimensional code in an image with a high level of accuracy.

(4) Size (Cs)

Evaluation value Cs for this evaluation item indicates the appropriateness of the size of the two-dimensional code with respect to the field of vision of the camera and is calculated by using the size of dots showing black cells and the cell size.

In the first embodiment of the invention described above, the cell size and the dot size were considered to be equal. In the second embodiment of the invention, they are considered to be different. Explained more in detail with reference to FIG. 16A, the cell size is C and the dot size is represented by the dot width D. Thus, as shown in FIG. 16B, the dot size varies according to the condition of the marking. The code size C is given by quotient S/M as explained above with reference to Formula (b) and remains constant independent of the dot size.

Figure 16A:
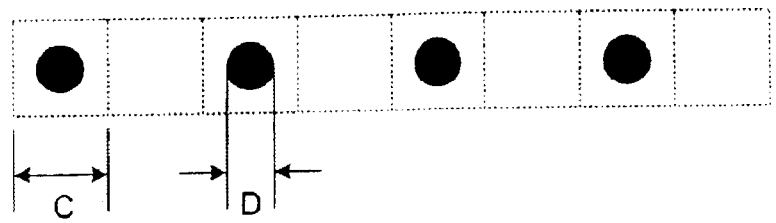
FIGS. 16A and 16B, together referred to as FIG. 16, are drawings for showing the concepts of cell size and dot size.
Figure 16B:
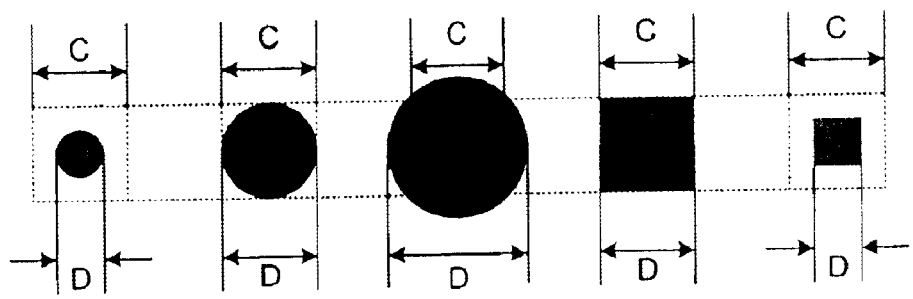

Although FIGS. 16A and 16B show a situation where each cell is marked with one dot, a plurality of dots may be marked on each cell. In such a situation, the size of the assembly of the plurality of dots is considered to be the dot size D.

In the instant example, evaluation values are individually obtained for the dot size D and the cell size C and the smaller one is used as evaluation value Cs.

The evaluation value for the dot size D is explained first. In the instant example, it is considered that the dot size must correspond to a size of at least 4 pixels in order to be able to determine the black-or-white condition of the individual cells. The minimum required dot size is variable according to the resolution of the CCD. It is also considered that the dot size D must be larger than at least 7 pixels in order to be able to distinguish the individual cells reliably. If dots are made too large, however, there is the danger of causing the phenomenon of oversized cells. If the number of pixels per dot becomes too large and the variation in the density within the dot becomes too large, it becomes difficult to determine whether the cell is black or white. In the instant example, therefore, the proper dot size D is between 7 and 10 pixels such that the evaluation value will be 100 if $7<D\leq10$. If $D\leq7$, the evaluation value is calculated by using Formula (d1). Formula (d1) gives evaluation value equal to 100 if D=7 but the evaluation value decreases as the value of D becomes smaller and it becomes 1 when D=4 which is the minimum number required for the identification.

The evaluation value for the cell size is calculated by substituting the cell size C and the symbol size M into Formula (d2). Formula (d2) is derived such that evaluation value will be equal to 1 when the two-dimensional code makes an angle of 45° with the field of vision and the length of the hypotenuse of the two-dimensional code is equal to that of one side of the field of vision. Since a margin corresponding to at least one cell must be provided around a two-dimensional code in an image when it is to be processed, Formula (d2) sets the length of one side of the code equal to C×(M+2) by including the margins at both ends. Thus, the length of the hypotenuse of the two-dimensional code is 1.4×C×(M+2).

The field of vision of the camera 3 is assumed to have 512 pixels in the x-direction and 484 pixels in the y-direction. Since a two-dimensional code may fail to fit inside the field of vision if the length of its hypotenuse exceeds the number of pixel in the y-direction, Formula (d2) is set such that the evaluation value becomes 1 when C=345/(M+2). Formula (d2) is also set such that the evaluation value becomes 100 when the dot size D is within a desired range, or when C=10.

Thus, the aforementioned evaluation value for the dot size becomes an indicator showing whether or not each dot in an object image maintains a size corresponding to the resolution. The evaluation value for the cell size C becomes an indicator of the possibility for the two-dimensional code to fail to be contained within the field of vision.

In the instant example, the warning level is set where the dot size D drops to 4 (or when Cs=1) or where the cell size reaches 345/(M+3). Since the dots in the image are not large enough to be recognized if the dot size D is 4 or less, a warning comment is displayed to the effect that the field of vision must be made smaller (or the camera should be lowered). If the cell size C comes to exceed 345/(M+3), on the other hand, this means that a two-dimensional code in the image is about to fail to be contained within the field of vision, a warning is displayed to the effect that the field of vision should be made larger (or the camera position should be raised).

(5) Location (Lo)

Figure 17:
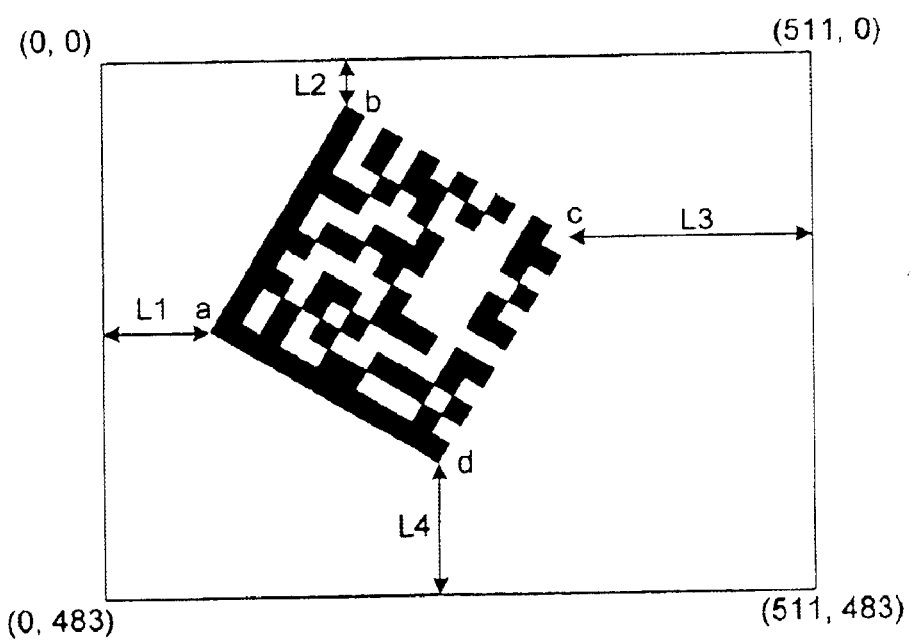
FIG. 17 is a drawing for showing the method of extracting parameter L used in a formula for location evaluation.

Evaluation value Lo for this evaluation item indicates how appropriately the two-dimensional code is located with respect to the field of vision of the camera 3. In the instant, the coordinates of the four corner points a, b, c and d of a two-dimensional code inside the object image are used, as shown in FIG. 17, to obtain distances L1, L2, L3 and L4, each from the corresponding corner point to the nearest side of the field of vision. The smallest of them is substituted into Formula (e) as L to calculate evaluation value Lo.

In the instant example, the two-dimensional code is considered to be located near the center of the field of vision if L is greater than ⅓ of the field of vision and Formula (e) is set such that Lo will be 100 when L is 161 pixels, 161 being nearly equal to one third of the number of pixels (484) in the y-direction.

Since it becomes impossible to read out a two-dimensional code without the aforementioned margin (say, of one cell), Formula (e) is set in the instant example such that evaluation value Lo becomes 1 when the smallest distance L becomes equal to the size of one cell (C=S/B). A warning level is set corresponding to the value of Lo when the smallest distance L becomes equal to 3C. If evaluation value Lo becomes smaller than this warning level, a warning comment is displayed to the effect that the two-dimensional code should be placed at the center of the field of vision.

(6) Background (Bg)

Evaluation value Bg for this evaluation item indicates how appropriate is the background condition of the two-dimensional code and is calculated by substituting into Formula (f) the extracted value FN obtained when the finder pattern is extracted. In Formula (f), $FN_{max}$ is as defined for Formula (A), that is, the maximum number of decoding processes that can be carried out within a specified length of time. $FN_{min}$ is a specified number greater than 0 and smaller than $FN_{max}$.

Formula (f) shows that evaluation value Bg takes its minimum value of 10 when $FN=FN_{max}$ and 100 when $FN=FN_{min}$. It is desirable, however, that evaluation value Bg remain 100 when the value of FN becomes smaller than $FN_{min}$. If FN is greater than $FN_{max}$, it means that the decoding failed.

FIG. 14 shows only the evaluation value Bg for this evaluation item. No warning level or comments are set. This is because decoding can be effected even if FN becomes equal to $FN_{max}$. It is also because, in the instant example, evaluation value Bg is obtained mainly for the purpose of learning the effects of the background when a two-dimensional code is attached to an uneven surface or a surface with a design. In a situation where the deterioration of parts of the marking device causes generation of noise somewhere other than the readout area of the two-dimensional code and where the quantity of such noise becomes a problem, the value of Bg when the difference between FN and $FN_{max}$ becomes equal to a specified value may be set as the warning level.

All these evaluation values, like those in the first embodiment of the invention, may be considered as being indicative of how well a two-dimensional code in an object image is suited for a readout process. According to the second embodiment of the invention, too, if the decoding is successful after the series of processes from the image taking to the decoding, evaluation values for all of the six evaluation items described above are calculated.

Figure 18A:
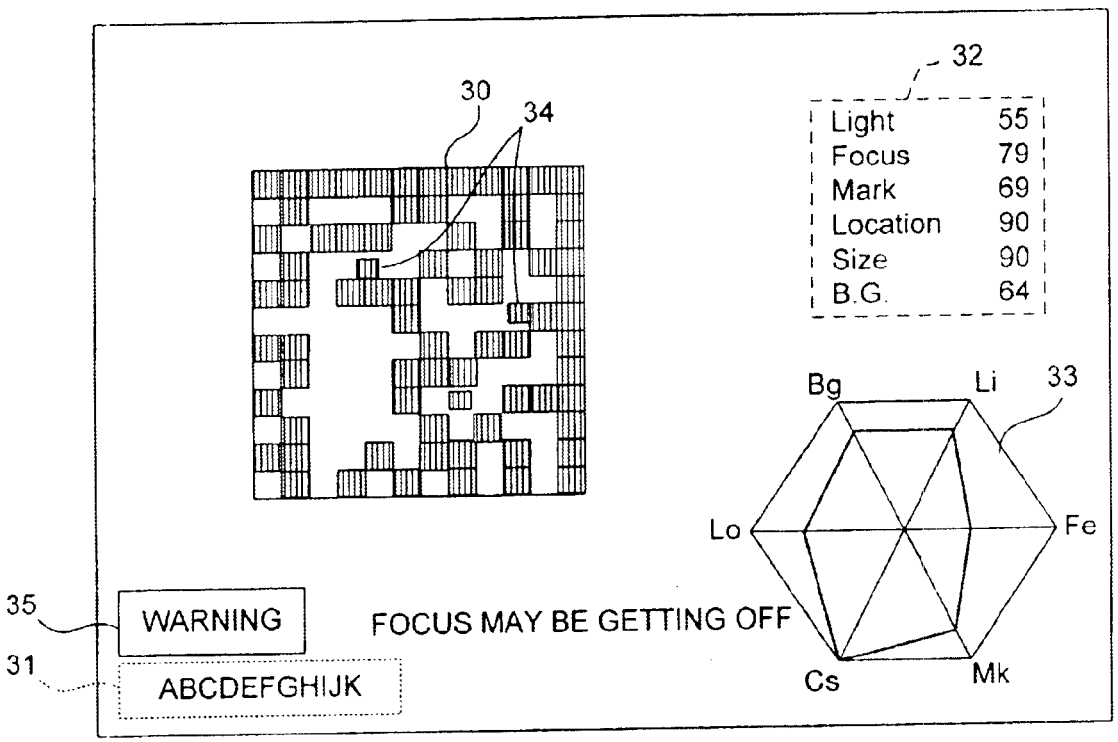
FIGS. 18A and 18B, together referred to as FIG. 18, are drawings for showing two kinds of display to be made on the monitor.
Figure 18B:
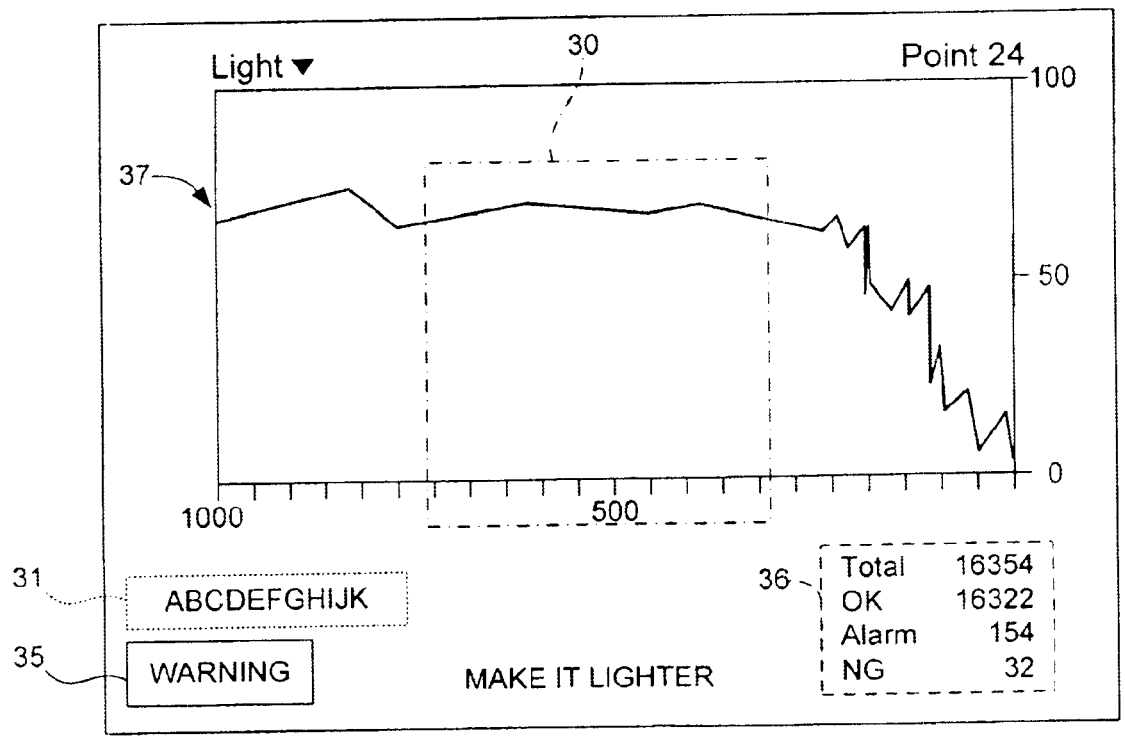

In the instant example, two kinds of display are allowed on the monitor 4, depending on the choice by the user. One is a screen (hereinafter referred to as Screen A) displaying the current evaluation values together with the object image and the decoded results of the optical data. FIG. 18A shows an example of Screen A including the object image 30 of the two-dimensional code. Numeral 31 indicates a display area for the readout data obtained from the two-dimensional code in this image. Each of the evaluation values is displayed not only numerically in area 32 but also as a radar chart 33. Pointers 34 are also displayed on the two-dimensional code in the object image for indicating the positions of the cells which were erroneously identified. If a specified evaluation value has reached its warning level, a warning mark 35 is displayed. A comment related to the evaluation value which reached the warning level is displayed next to the warning mark 35.

The other kind of display is a screen (hereinafter referred to as Screen B) which includes a graph 37 for showing changes with time of the evaluation value for a specified evaluation item (lighting in the example shown in FIG.

18B). Screen B also displays the image 30 of the two-dimensional code which has just been processed (only by its contour in the instant example), a display area 36 for historical data such as the total number of processes and number of successes.

In the instant example, changes with time of four evaluation values for four evaluation items (light, focus, marking and location) can be displayed. The item to be selected can be changed by the user. The warning mark 35 is displayed in connection with the current evaluation value. Evaluation values for other items such as size and background may be also displayed.

In the instant example, every time a new evaluation value is calculated, a new average of a specified number of earlier evaluation value inclusive of the most recently calculated one (the so-called moving average) is also calculated. The graph displayed on aforementioned Screen B shows the variation of this average. The zero on the horizontal axis indicates the present time. In the instant example, this average value is used to carry out the process of evaluating the degree of variations in the evaluation values or predicting the tendency of change in the two-dimensional code from the change of the evaluation value with time. If it is found that the aforementioned degree of variations is too large or predicted that it is going to be impossible to read out the two-dimensional code, a warning is displayed or outputted with a clear statement regarding the evaluation item on the basis of which this judgment has been made.

For evaluating the degree of variations in an evaluation value, the standard deviation $\sigma$ is obtained over a specified number of past averages $X_n$ and the value of $(X_0-3\sigma)$ is checked where $X_0$ is the most recently obtained average value. Specified warning data may be outputted when the value of $(X_0-3\sigma)$ becomes equal to or less than zero.

According to the theory of statistics, 99.7% of samples comprising a mother group are included in the range of $X_0 \pm 3\sigma$. Thus, unless the aforementioned warning data are outputted, the user may conclude that every evaluation value is in stable condition and the readout process of two-dimensional codes can proceed without any trouble.

Figure 19:
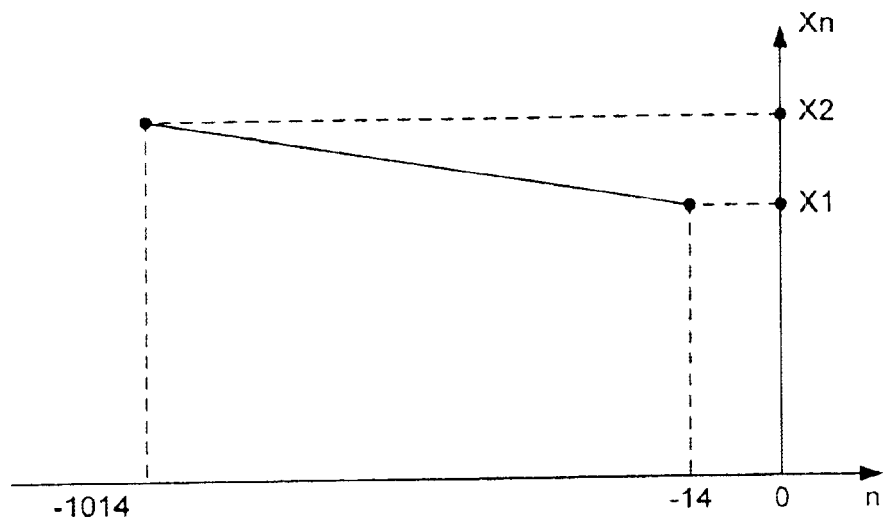
FIG. 19 is a drawing for showing a method of predicting the tendency of change in the two-dimensional code.

In the process of predicting the tendency of change in two-dimensional codes according to an example shown in FIG. 19, an average value $X_1$ obtained 14 times earlier and another average value $X_2$ obtained still 1000 times earlier are extracted and plotted on a graph having a time axis and an axis for average values $X_n$.

These two points are used next to determine a straight line given by Equation (1) shown below that illustrates the change in the evaluation value $X_n$:

$$Xn = n(X_2 - X_1)/1000 + X_2 + 7(X_2 - X_1)/500 \qquad \text{Equation (1)}$$

Let us assume that the decoding process will fail in the 5000th process from the present when the evaluation value is predicted to become equal to zero. Under this assumption, n is set equal to 5000 in Equation (1) and if $X_n$ then becomes equal to or less than zero, the relationship between $X_1$ and $X_2$ becomes as given below:

$$X_2 \leq 2507 X_1/3007 \approx 0.83 X_1 \qquad \text{Equation (2)}$$

Thus, when $X_1$ and $X_2$ satisfy the relationship given by Equation (2), it may be predicted that the readout process on the 5000th two-dimensional code will fail. In the instant example, average values $X_1$ and $X_2$ 14 times and 1014 times earlier are extracted for every item every time a new two-dimensional code is processed and it is checked whether Equation (2) is satisfied by them. If Equation (2) is found to be satisfied for any item, warning data with a clear statement indicating the item are displayed on the monitor 4 or outputted to the host system 11.

Figure 20:
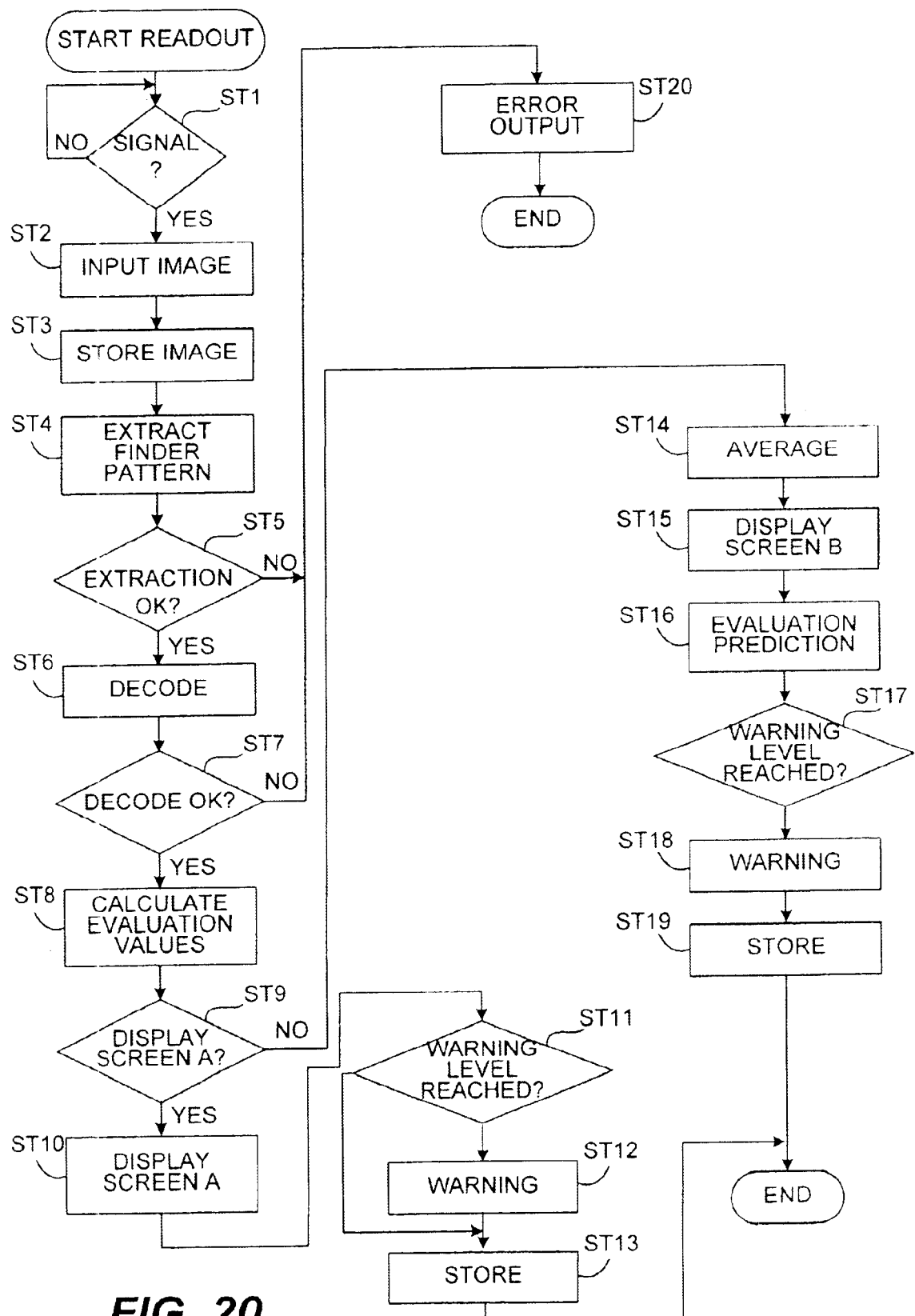
FIG. 20 is a flowchart for a readout process according to a second embodiment of the invention.

FIG. 20 shows a routine for the readout process according to the second embodiment of the invention. It is assumed that the user selects before the start of this routine whether Screen A or Screen B is to be displayed on the monitor 4. If Screen B is selected, the user also selects evaluation items for which evaluation values are to be displayed and between the process of evaluating the aforementioned variations and that of predicting the tendency of change in the two-dimensional codes.

In FIG. 20, steps ST1-ST7 and Step 20 are the same as in FIG. 12 and hence will not be repetitiously explained. If the decoding process is successful and Step ST7 is YES, evaluation values for the aforementioned six items are calculated (Step ST8). If the display of Screen A has been selected (YES in Step ST9), Screen A with six evaluation values as well as the object image and the readout data are displayed (Step ST10). If any of the calculated evaluation values is found to have reached the corresponding warning level (YES in Step ST11), a warning mark or a warning comment is displayed (Step ST12). Data with the same content may also be outputted to the host system 11.

Thereafter, evaluation values Li, Fc, Mk and Lo are stored in the main memory 22 and the readout process is completed. If none of the evaluation values has reached the corresponding warning level, step ST12 is skipped.

If Screen B has been selected by the user (NO in Step ST9), a specified number of evaluation values obtained earlier inclusive of the one most recently obtained for the selected evaluation items are read out from the main memory 22 and average value $X_0$ is calculated (Step ST14). Thereafter, a plurality of earlier obtained average values are read out of the main memory 22 and Screen B including a graph showing its change with time is displayed (Step ST15).

Next, either the process of evaluating the variations in evaluation values or that of predicting the tendency of change in the two-dimensional codes is carried out in response to the user's selection (Step ST16). The process of Step ST16 may be carried out only for the evaluation items selected for the display in Screen B but all of the four evaluation values Li, Fe, Mk and Lo may be processed.

If the result of any of the processes in Step ST16 is found to have reached the corresponding warning level (YES in Step ST17), a specified warning is displayed on the monitor 4 (Step ST18) and a similar warning may be outputted to the host system 11, Thereafter, the evaluation values obtained in Step ST8 and the average values obtained in Step ST14 are stored in the main memory 22 and the readout process is completed. If no processing result has reached the corresponding warning level, step ST18 is skipped.

Since the steps after Step ST8 are carried out only if the decoding was successful, there is no need to immediately stop the readout process on subsequent two-dimensional code even if a display of warning is made in Step ST12 or ST18. As long as the cause for lowering the quality of the two-dimensional codes is not removed, however, the same warning display and output will continue to be made every time the readout process shown in FIG. 20 is carried out.

According to the setting shown in FIG. 14, a specific warning display is made showing a suggested countermeasure to be taken if evaluation value Li, Fe, Mk or Lo reaches the corresponding warning level for lighting, focus, marking or background. Thus, even an ordinary user can proceed correctly to improve the quality of the two-dimensional codes.

When a two-dimensional code reader is initially set or the kind of two-dimensional codes or the kind of the component 9 is changed, inadequacy in lighting, focusing, the field of vision of the camera 3 and the position of the two-dimensional code can be shown to the user if a test readout process is run according to FIG. 20. Thus, the user can easily make proper adjustments and set up a suitable environment for reading out two-dimensional codes. If the process for evaluating the degree of variations in evaluation values is selected, the user can predict the level of stability at which two-dimensional codes can be read out.

After a regular operation of the two-dimensional code reader 1 is started, since each evaluation value is calculated every time a decoding operation is successful and a comparison is made with the corresponding warning level, the user can be quickly made aware if there is a tendency that the two-dimensional codes are becoming difficult to read out. The user can also elect to be able to predict whether the readout process can be successfully carried out after a specified number of processes will have been carried out.

In summary, the user of a two-dimensional code reader of this invention can quickly learn if the quality of the optical data code in the image being obtained is changing in the direction of becoming difficult to read out. Thus, the cause of making the quality lower can be quickly removed before the quality of the optical data code deteriorates to such an extent that the decoding becomes impossible. Thus, the user can continue to carry out readout processes without encountering any problem with decoding even when optical data codes are continuously read out. Even if the quality of optical data code is deteriorating, since such a change can be quickly detected according to this invention, the readout process need not be stopped immediately. This makes the code reader much more convenient to use.

What is claimed is:

1. A method of reading out an optical data code, said method comprising the steps of:
    sequentially carrying out image-taking, code-extracting and decoding steps wherein said image-taking step comprises taking an image of an optical data code comprising visually identifiable symbols, said code-extracting step comprises extracting said optical data code in said image by carrying out a specified image processing on said image and said decoding step comprises carrying out a different image processing on said extracted optical data code and decoding optical data represented by said optical data code from results of said different image processing;
    obtaining a specified evaluation value for said optical data code in said image from results of processes carried out prior to said decoding step if said decoding step was successful in decoding said optical data;
    storing said evaluation value; and
    outputting change-showing data showing changes in said evaluation value with time by using said evaluation value and a plurality of earlier evaluation values that were stored previously.

2. The method of claim 1 wherein the step of outputting change-showing data includes the step of displaying said change-showing data in contrast to a specified warning level.

3. The method of claim 1 wherein the code-extracting step comprises the steps of:
    carrying out a correlation calculation while scanning a model with a specified pattern contained in said optical data code on said image taken in the image-taking step; and
    identifying as extraction position of said optical data code where a correlation value obtained by said correlation calculation exceeds a specified threshold value;
    wherein the correlation value obtained at said extraction position is identified as said evaluation value.

4. The method of claim 1 wherein said code-extracting step comprises the step of extracting a specified pattern included in said optical data code from said image taken in the image-taking step;
    wherein said evaluation value is obtained by using the number of extractions of the specified pattern in the code-extracting step.

5. The method of claim 1 wherein said decoding step comprises the step of individually identifying small areas each representing a minimum unit of said optical data;
    wherein said evaluation value is obtained for at least one item selected from the group consisting of focus arrangement when said image is taken of said optical data code, contrast in said optical data code, size of said small areas, density distribution in said small areas and location of said optical data code by a calculation by using identification results of said small areas and image data inside an image area that includes said optical data code.

6. The method of claim 1 wherein said decoding step comprises the step of individually identifying small areas each representing a minimum unit of said optical data;
    wherein the step of obtaining an evaluation value includes the step of calculating a value indicative of degree of error in the step of individually identifying small areas.

7. The method of claim 1 further comprising the steps of:
    using evaluation values stored while a plurality of cycles of said image-taking, code-extracting and decoding steps are carried out to predict whether or not said decoding step will be successful after processes of said image-taking, code-extracting and decoding steps are carried out further for a specified number of cycles; and
    carrying out a specified warning process if it is predicted that the decoding step will not be successful.

8. A method of reading out an optical data code, said method comprising the steps of:
    sequentially carrying out image-taking, code-extracting and decoding steps wherein said image-taking step comprises taking an image of an optical data code comprising visually identifiable symbols, said code-extracting step comprises extracting said optical data code in said image by carrying out a specified image processing on said image and said decoding step comprises carrying out a different image processing on said extracted optical data code and decoding optical data represented by said optical data code from results of said different image processing;
    obtaining a specified evaluation value for said optical data code in said image from results of processes carried out prior to said decoding step if said decoding step was successful in decoding said optical data;
    comparing said evaluation value with a specified warning level; and
    carrying out a specified warning process if said evaluation value reaches said warning level.

9. The method of claim 8 wherein the code-extracting step comprises the steps of:
    carrying out a correlation calculation while scanning a model with a specified pattern contained in said optical data code on said image taken in the image-taking step; and identifying as extraction position of said optical data code where a correlation value obtained by said correlation calculation exceeds a specified threshold value;

wherein the correlation value obtained at said extraction position is identified as said evaluation value.

10. The method of claim 8 wherein said code-extracting step comprises the step of extracting a specified pattern included in said optical data code from said image taken in the image-taking step; and wherein said evaluation value is obtained by using the number of extractions of the specified pattern in the code-extracting step.

11. The method of claim 8 wherein said decoding step comprises the step of individually identifying small areas each representing a minimum unit of said optical data; and wherein said evaluation value is obtained for at least one item selected from the group consisting of focus arrangement when said image is taken of said optical data code, contrast in said optical data code, size of said small areas, density distribution in said small areas and location of said optical data code by a calculation by using identification results of said small areas and image data inside an image area that includes said optical data code.

12. The method of claim 8 wherein said decoding step comprises the step of individually identifying small areas each representing a minimum unit of said optical data; and wherein the step of obtaining an evaluation value includes the step of calculating a value indicative of degree of error in the step of individually identifying small areas.

13. An optical data code reader comprising:

image taking means for taking an image of an optical data code comprising visually identifiable symbols;

image processing means for extracting said optical data code by carrying out a specified image processing on said image;

decoding means for carrying out a different image processing on said extracted optical data code and decoding optical data represented by said optical data code from results of said different image processing;

evaluation value obtaining means for obtaining a specified evaluation value for said optical data code in said image from results of processes carried out by at least one selected from the group consisting of said image processing means and said decoding means if said decoding means was successful in decoding said optical data;

memory means for storing said evaluation value; and outputting means for generating change-showing data showing changes in said evaluation value with time by using a plurality of evaluation values stored in said memory means.

14. The optical data code reader of claim 13 wherein said outputting means includes display means for displaying a specified warning level.

15. The optical data code reader of claim 13 wherein said image processing means includes:

correlation calculating means for carrying out a correlation calculation while scanning a model with a specified pattern contained in said optical data code on said image taken by said image taking means; and identifying means for identifying as extraction position of said optical data code where a correlation value obtained by said correlation calculating means exceeds a specified threshold value;

wherein the evaluation value obtaining means stores said correlation value obtained at said extraction position of said optical data code until said different image processing by said decoding means is finished and identifies said stored correlation value as said evaluation value when said decoding means succeeds in decoding the optical data.

16. The optical data code reader of claim 13 wherein said image processing means extracts a specified pattern included in said optical data code from said image taken by said image taking means, and wherein said evaluation value obtaining means calculates said evaluation value by using the number of extractions of the specified pattern.

17. The optical data code reader of claim 13 wherein said decoding means includes means for individually identifying small areas each representing a minimum unit of said optical data; and wherein said evaluation value obtaining means calculates an evaluation value for at least one item selected from the group consisting of focus arrangement when said image is taken of said optical data code, contrast in said optical data code, size of said small areas, density distribution in said small areas and location of said optical data code by using identification results of said small areas and image data inside an image area that includes said optical data code.

18. The optical data code reader of claim 13 wherein said decoding means includes means for individually identifying small areas each representing a minimum unit of said optical data; and wherein said evaluation value obtaining means calculates a value indicative of degree of error when said small areas are identified.

19. The optical data code reader of claim 13 further comprising:

predicting means for predicting by using a plurality of evaluation values stored in said memory means whether or not said optical data will be decoded successfully after processes by said image-taking means, said image processing means and said decoding means are carried out for a specified number of cycles; and warning means for carrying out a specified warning process if said predicting means predicts that it will become impossible to read out the optical data after said specified number of cycles.

20. An optical data code reader comprising:

image taking means for taking an image of an optical data code comprising visually identifiable symbols;

image processing means for extracting said optical data code by carrying out a specified image processing on said image;

decoding means for carrying out a different image processing on said extracted optical data code and decoding optical data represented by said optical data code from results of said different image processing;

evaluation value obtaining means for obtaining a specified evaluation value for said optical data code in said image from results of processes carried out by at least one selected from the group consisting of said image processing means and said decoding means if said decoding means was successful in decoding said optical data;

judging means for judging whether or not said evaluation value obtained by said evaluation value obtaining means has reached a specified warning level; and warning means for outputting specified warning data when said judging means judges that said evaluation value has reached said warning level.

* * * * *